US009881647B2

(12) United States Patent
McCauley et al.

(10) Patent No.: US 9,881,647 B2
(45) Date of Patent: Jan. 30, 2018

(54) METHOD TO ALIGN AN IMMERSIVE VIDEO AND AN IMMERSIVE SOUND FIELD

(71) Applicant: VideoStitch Inc., San Francisco, CA (US)

(72) Inventors: Lucas McCauley, Vincennes (FR); Alexander Fink, San Jose, CA (US); Nicolas Burtey, Mountain View, CA (US); Stéphane Valente, Paris (FR)

(73) Assignee: VIDEOSTITCH INC., San Francisco, CA (US)

( * ) Notice: Subject to any disclaimer, the term of this patent is extended or adjusted under 35 U.S.C. 154(b) by 38 days.

(21) Appl. No.: 15/194,860

(22) Filed: Jun. 28, 2016

(65) Prior Publication Data

US 2017/0372748 A1    Dec. 28, 2017

(51) Int. Cl.
*G11B 27/031* (2006.01)
*H04S 7/00* (2006.01)
*H04N 21/234* (2011.01)
*H04N 21/233* (2011.01)
*H04N 21/218* (2011.01)
*H04N 21/81* (2011.01)

(52) U.S. Cl.
CPC ..... *G11B 27/031* (2013.01); *H04N 21/21805* (2013.01); *H04N 21/233* (2013.01); *H04N 21/23418* (2013.01); *H04N 21/816* (2013.01); *H04N 21/8106* (2013.01); *H04S 7/304* (2013.01); *H04S 2400/11* (2013.01)

(58) Field of Classification Search
CPC ........... G11B 27/031; H04N 21/21805; H04N 21/23418; H04N 21/233; H04N 21/8106; H04N 21/816; H04S 7/304; H04S 2400/11
See application file for complete search history.

(56) References Cited

U.S. PATENT DOCUMENTS

2001/0012368 A1*  8/2001  Yamazaki .................. H04S 7/30
                                                        381/17
2004/0076301 A1*  4/2004  Algazi ..................... H04S 7/304
                                                        381/17
(Continued)

OTHER PUBLICATIONS

VVAudio, "TetraMic™/VVMic™ Users Guide", Jun. 29, 2007, 10 pages.

(Continued)

*Primary Examiner* — Hung Dang
*Assistant Examiner* — Sunghyoun Park
(74) *Attorney, Agent, or Firm* — Christopher P. Maiorana, PC

(57) ABSTRACT

A system comprising a video source, one or more audio sources and a computing device. The video source may be configured to generate a plurality of video streams that capture a view of an environment. The one or more audio sources may be configured to capture audio data of the environment. The computing device may comprise one or more processors configured to (i) perform a stitching operation on the plurality of video streams to generate a video signal representative of an immersive field of view of the environment, (ii) generate a sound field based on the audio data, (iii) identify an orientation for the sound field with respect to the video signal, and (iv) determine a rotation of the sound field based on the orientation. The rotation of the sound field aligns the sound field to the video signal.

18 Claims, 13 Drawing Sheets

(56) References Cited

U.S. PATENT DOCUMENTS

| | | | | |
|---|---|---|---|---|
| 2006/0029242 A1* | 2/2006 | Metcalf | .................... | H04S 7/30 381/300 |
| 2006/0247918 A1* | 11/2006 | Schmidt | ................ | H04S 7/302 704/200 |
| 2009/0002376 A1* | 1/2009 | Xu | ......................... | G06T 13/40 345/473 |
| 2012/0162362 A1* | 6/2012 | Garden | .............. | H04N 13/0468 348/42 |
| 2012/0162363 A1* | 6/2012 | Huang | ................ | H04N 13/026 348/43 |
| 2013/0266238 A1* | 10/2013 | Jin | ........................ | H04N 5/232 382/254 |
| 2013/0342731 A1* | 12/2013 | Lee | ................... | H04N 5/23293 348/231.4 |
| 2015/0016641 A1* | 1/2015 | Ugur | .................. | G10L 21/0216 381/303 |
| 2016/0249134 A1* | 8/2016 | Wang | .................... | H04R 3/005 |
| 2016/0255273 A1* | 9/2016 | Wakamatsu | ....... | H04N 5/23248 348/208.99 |

OTHER PUBLICATIONS

GamesIndustry International, "FMOD Studio", http://www.gamesindustry.biz/articles/fmod-studio-new-game-audio-creation-system-to-be-revealed-at-gdc, Feb. 21, 2011, 3 pages.

Kolor, "My First Virtual Tour with Panotour Pro 2", https://www.youtube.com/watch?v=iD3K7OkHxn0, Mar. 4, 2014, pp. 1-2.

IMX123LQT, "Diagonal 6.46 mm (Type 1/2.8) Approx. 3.21 M-Effective Pixel Color CMOS Image Sensor", http://www.sony.net/Products/SC-HP/new_pro/june_2014/imx123_e.html, Apr. 2014, 4 pages.

Ganesh, T.S., "Zotac ZBOX MAGNUS EN970 Review—A Gaming mini-PC Done Right", http://www.anandtech.com/Show/9660/zotac-zbox-magnus-en970-review-a-gaming-minipc-done-right, Sep. 28, 2015, 2 pages.

* cited by examiner

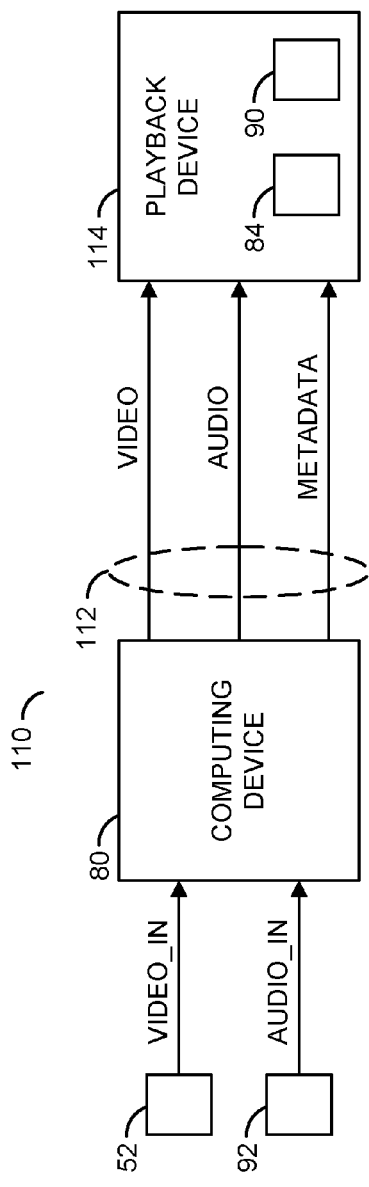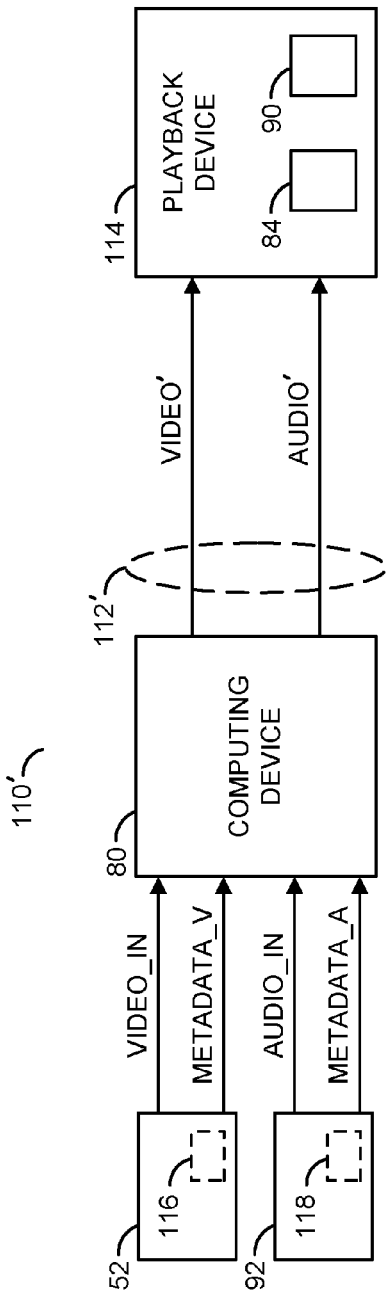

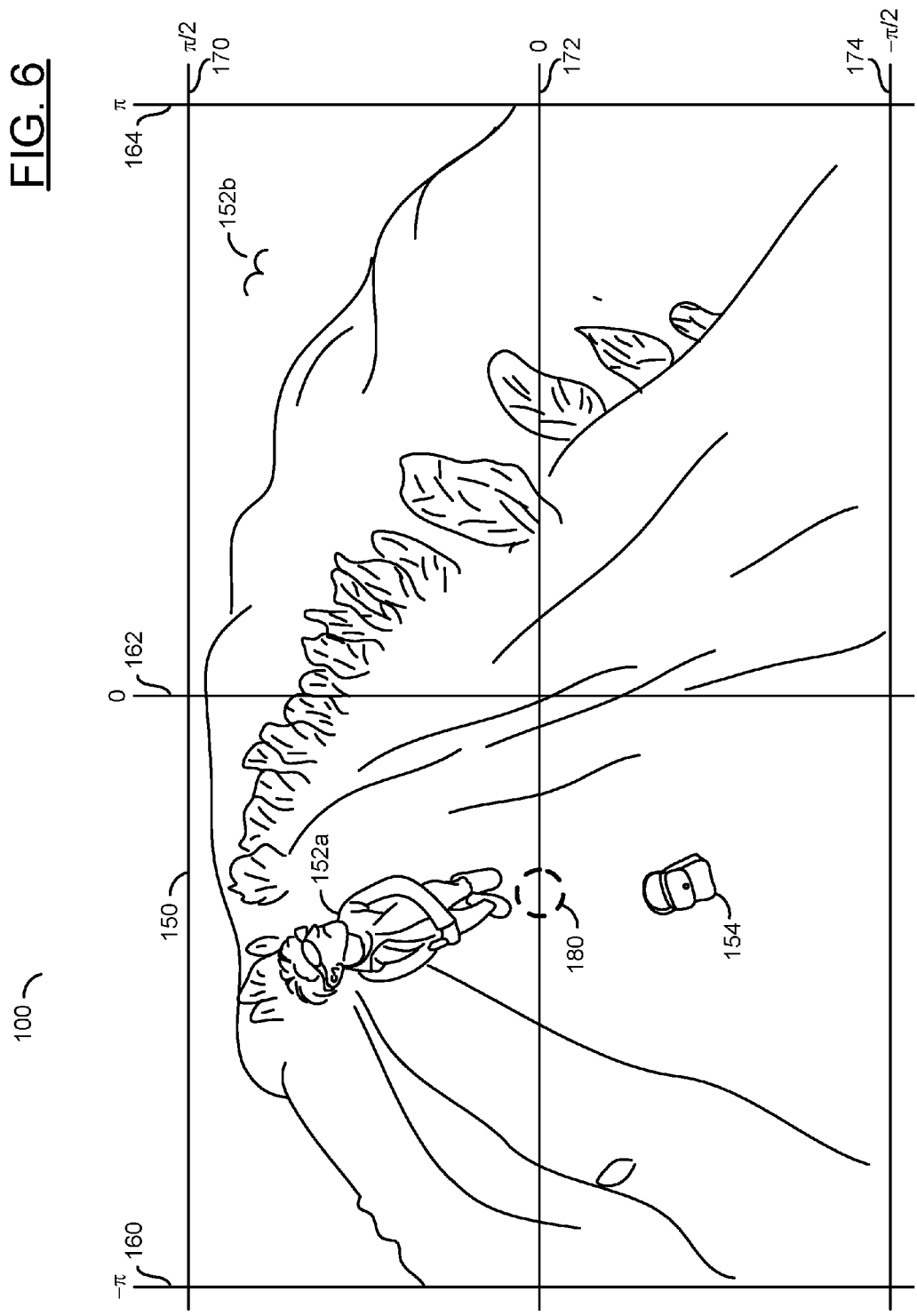

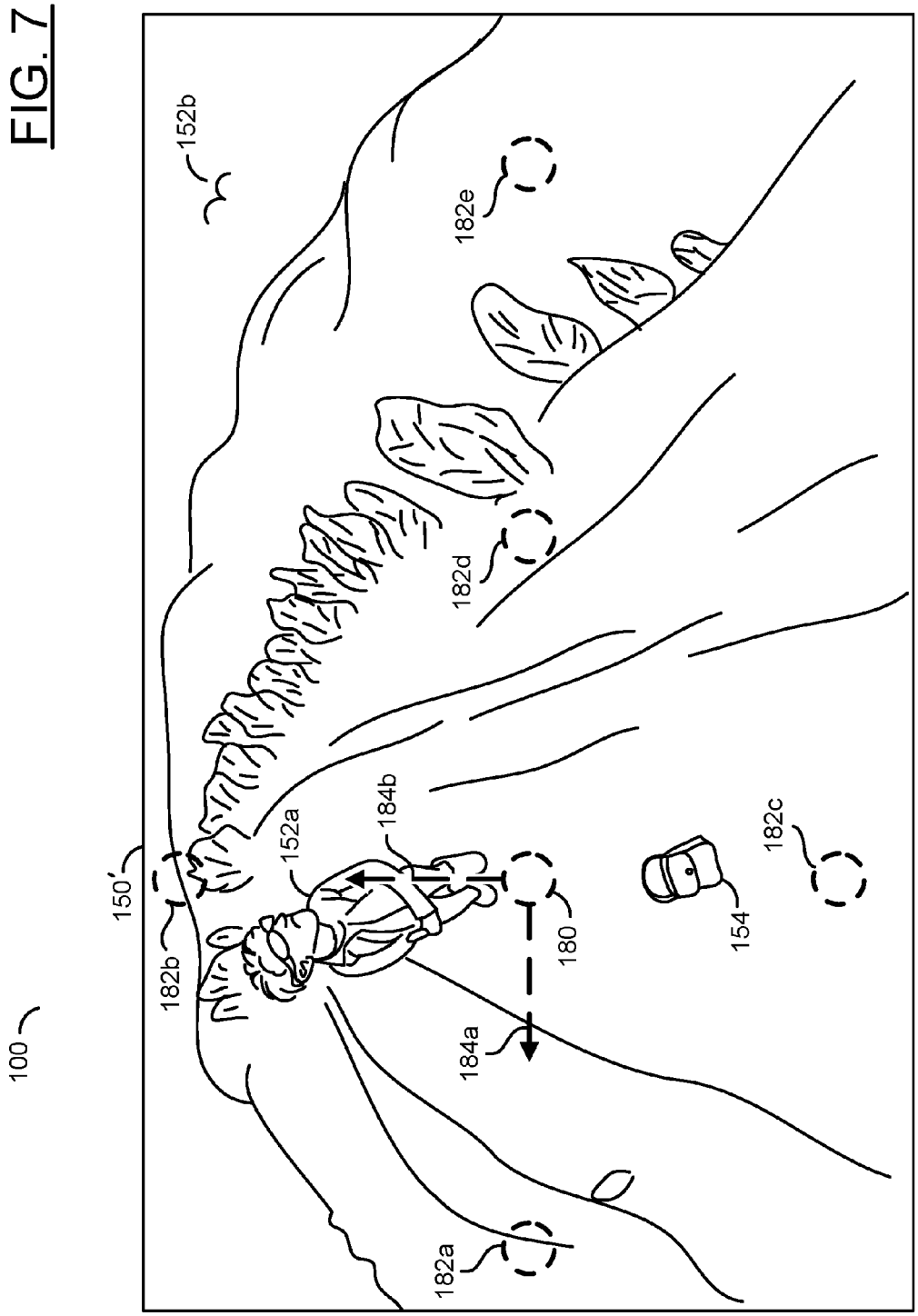

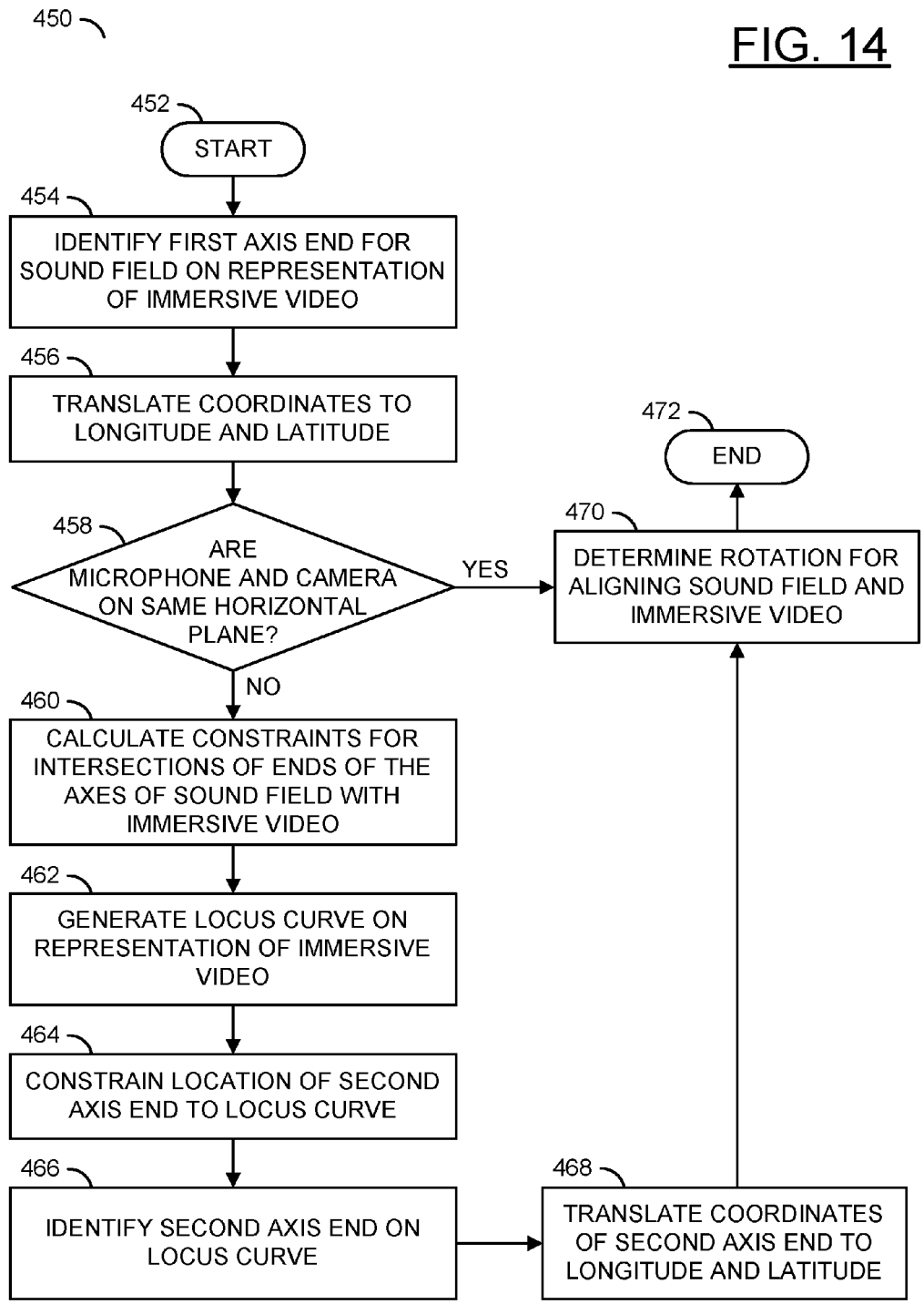

METHOD TO ALIGN AN IMMERSIVE VIDEO AND AN IMMERSIVE SOUND FIELD

FIELD OF THE INVENTION

The invention relates to audio and video generally and, more particularly, to a method and/or apparatus to align an immersive video and an immersive sound field.

BACKGROUND

Immersive sound fields (i.e., 3D audio) can be represented in B-format audio (i.e., ambisonics) or in an object-audio format (vector base amplitude panning (VBAP)). Immersive sound fields can be represented by "panning" a mono audio source in 3D space using two angles (i.e., theta and phi) or by acquiring a sound field using microphones designed to capture sound fields. Ambisonics uses at least four audio channels (B-format audio) to encode an entire 360° sound sphere. Object-audio uses mono audio "objects" with associated metadata indicating a position to a proprietary renderer (e.g., Dolby Atmos).

A spherical video (or immersive video) can be represented in various formats. Spherical video can be represented using 2D equirectangular projections, using cubic projections, through a head-mounted display (i.e., an Oculus Rift, HTC Vive, etc.), or using other projections. Projections map a point of the spherical video (defined in terms of X/Y/Z coordinates, or in terms of longitude and latitude angles) to a 2D point (X and Y) in the projected view. A point in a 2D projected view (i.e., equirectangular or cubic views) directly relates to a 3D point on the sphere.

When recording an immersive video and a sound field, there can be situations where the video and audio acquisition devices are separated (i.e., when the microphones are not integrated into the spherical camera). The video and audio acquisition devices can be placed manually in an environment to capture a scene. Generally, a good practice is to place audio and video acquisition devices close to each other. When video and audio acquisition devices are separated, the coordinate system axes of the sound field and the immersive video are not necessarily aligned.

When the sound field and the immersive video are not aligned, there can be a mismatch between what is seen by a viewer and what is heard. When the audio played back does not match the corresponding audio source, the viewer does not have an immersive experience. Conventional methods available to content creators for rotating sound fields are not intuitive.

Audio software plugins are available that allow a content creator to rotate a sound field by interacting with a user interface that shows a 2D orthographic projection of the sound sphere. Interacting with the sound sphere is not intuitive because the audio is completely separate from the video. Without visual feedback, aligning the sound field to the immersive video is cumbersome for a content creator because the content creator needs to rotate the sound field and then verify an orientational alignment with the immersive video by playing the video with immersive sound and carefully judging by ear whether the audio and video are aligned.

It would be desirable to implement a method for aligning an immersive video and an immersive sound field.

SUMMARY

The invention concerns a system comprising a video source, one or more audio sources and a computing device. The video source may be configured to generate a plurality of video streams that capture a view of an environment. The one or more audio sources may be configured to capture audio data of the environment. The computing device may comprise one or more processors configured to (i) perform a stitching operation on the plurality of video streams to generate a video signal representative of an immersive field of view of the environment, (ii) generate a sound field based on the audio data, (iii) identify an orientation for the sound field with respect to the video signal, and (iv) determine a rotation of the sound field based on the orientation. The rotation of the sound field aligns the sound field to the video signal.

BRIEF DESCRIPTION OF THE FIGURES

Embodiments of the invention will be apparent from the following detailed description and the appended claims and drawings in which:

FIG. 4 is a diagram illustrating applying a rotation as metadata to a bitstream comprising immersive data;

FIG. 5 is a diagram illustrating applying a rotation to immersive data before transmission of a bitstream;

FIG. 6 is a diagram illustrating a graphical representation on an interface for identifying an axis for a sound field on an immersive video;

FIG. 7 is a diagram illustrating a graphical representation on an interface for identifying multiple axes for a sound field on an immersive video;

FIG. 14 is a flow diagram illustrating a method for identifying an orientation of a sound field when the audio capture device and the video capture device are not on the same horizontal plane.

DETAILED DESCRIPTION OF THE EMBODIMENTS

Embodiments of the present invention include providing a method for aligning an immersive video and an immersive sound field that may (i) provide a graphical interface for identifying an axis end for a sound field, (ii) provide a graphical interface for identifying a rotation of an axis for a sound field, (iii) enable a user to interact with an immersive video and a sound field, (iv) provide metadata to a playback device, (v) provide a graphical representation of axis ends of a sound field on a representation of an immersive video, (vi) align a sound field with an immersive video when a video capture device and an audio capture device are in different locations, (vii) enable a user to interact with an immersive video while identifying an orientation of a sound field and/or (viii) be easy to implement.

The invention relates to aligning a coordinate system of an audio sound field (e.g., 3D audio, immersive audio, spherical audio, etc.) with a coordinate system of an immersive video (e.g., 360 degree video, 3D video, spherical video, panoramic video, cylindrical video, partially spherical video (e.g., half-sphere), etc.). The sound field and the video may both have a coordinate system. Each coordinate system may be defined by 3 axes (e.g., X, Y and Z) corresponding, respectively, with the front/back, left/right and top/bottom axis. A 3D rotation may be defined in terms of rotations around the coordinate system axes (e.g. a roll around the X axis, a pitch around the Y axis and a yaw around the Z axis). The invention may edit the coordinate system of the immersive video and/or the immersive audio to align an immersive video to an immersive sound field.

During post-production and/or editing of a captured video shot, the immersive video and/or the immersive sound field may be combined into a single file for distribution. Similarly, the immersive video and/or sound field may be combined into a single file (or parts of a single file) for distribution in a live application (e.g., a live stream). For example, the sound field and the immersive video may be combined in a single stream (e.g., a bitstream comprising video and audio). A system may be implemented to perform a rotational alignment of the coordinate systems between the audio and video signals, so that the locations of the various sound sources in the captured scenes are correctly aligned with corresponding sound-emitting objects in the video.

A visual representation of a coordinate system of the sound field may be implemented on a user interface. The visual representation of the coordinate system may be generated in a representation of the immersive video (e.g., a projection of the immersive video). A human operator (e.g., performing post-production) may be able to perform a rotational adjustment of the sound field to align the sound field to the immersive video.

Figure 1:
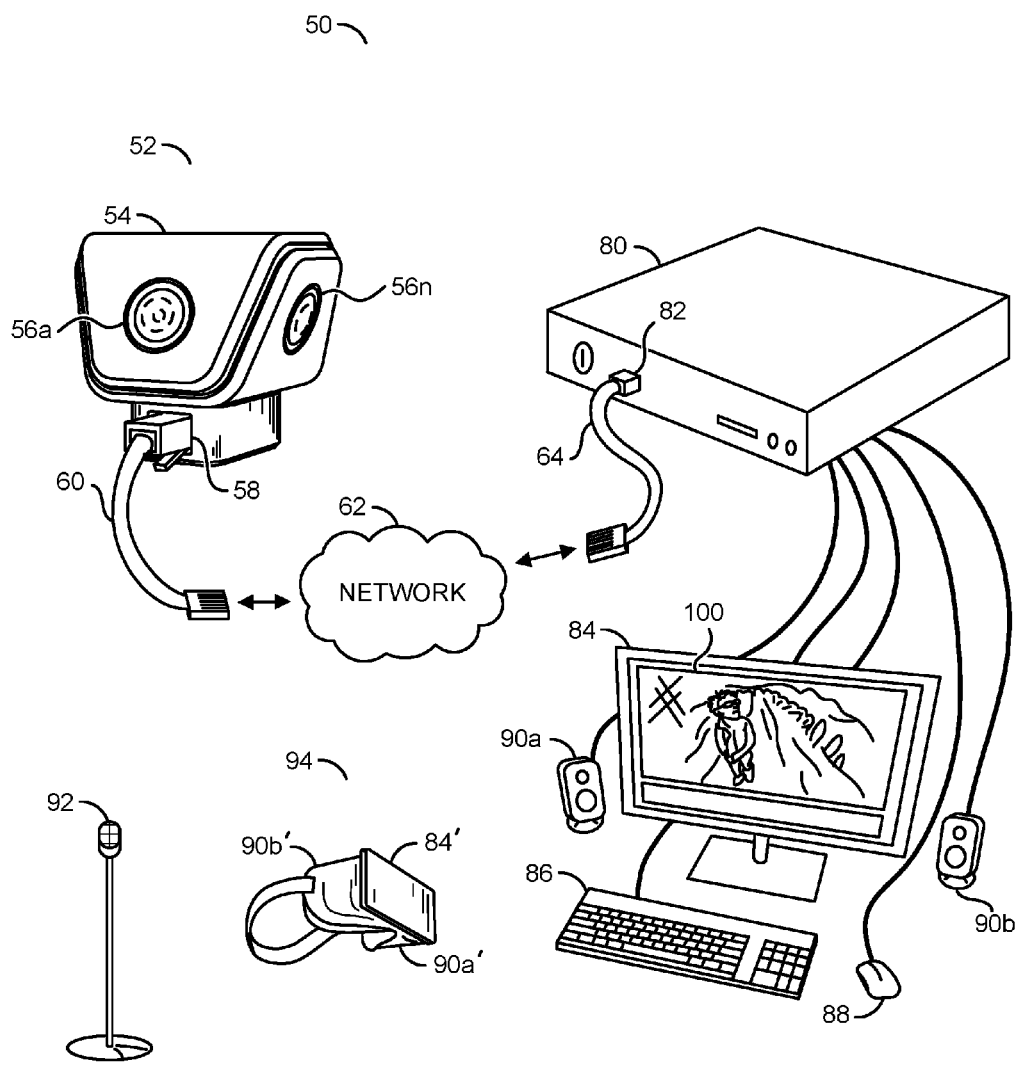
FIG. 1 is a diagram of a system according to an example embodiment of the present invention.

Referring to FIG. 1, a diagram illustrating a system 50 according to an example embodiment of the present invention is shown. The system 50 may comprise a capture device 52, a network 62, a computing device 80, a video display device 84, audio output devices 90a-90b, an audio capture device 92 and/or an interface 100. The system 50 may be configured to capture video of an environment surrounding the capture device 52, capture audio of an environment surrounding the audio capture device 92, transmit the video and/or audio to the computing device 80 via the network 62, playback the video on the video display device 84, playback the audio via the audio output devices 90a-90b and allow a user to interact with the video and/or audio with the interface 100. Other components may be implemented as part of the system 50.

The capture device 52 may comprise a structure 54, lenses 56a-56n, and/or a port 58. Other components may be implemented. The structure 54 may provide support and/or a frame for the various components of the capture device 52. The lenses 56a-56n may be arranged in various directions to capture the environment surrounding the capture device 52. In an example, the lenses 56a-56n may be located on each side of the capture device 52 to capture video from all sides of the capture device 52 (e.g., provide a video source, such as an immersive field of view). The port 58 may be configured to enable data to be communicated and/or power to be transmitted and/or received. The port 58 is shown connected to a wire 60 to enable communication with the network 62.

In some embodiments, the capture device 52 may also comprise an audio capture device (e.g., a microphone) for capturing audio sources surrounding the capture device 52 (e.g., the video capture device 52 and the audio capture device 92 are tied together as a recording rig). In one example, when the capture device 52 comprises the audio capture device, the coordinates of the captured immersive video and/or the captured sound field may be aligned. In another example, when the capture device 52 does not comprise the audio capture device, the coordinates of the captured immersive video and/or the captured sound field may be out of alignment.

The computing device 80 may comprise memory and/or processing components for performing video and/or audio encoding operations. The computing device 80 may be configured to perform video stitching operations. The computing device 80 may be configured to read instructions and/or execute commands. The computing device 80 may comprise one or more processors. The processors of the computing device 80 may be configured to analyze video data and/or perform computer vision techniques. In an example, the processors of the computing device 80 may be configured to automatically determine a location of particular objects in a video frame.

The computing device 80 may be configured to perform operations to encode and/or decode an immersive video (e.g., immersive video frames) and/or an immersive sound field. In an example, the computing device 80 may provide output to the video display device 84 and/or the audio output devices 90a-90b to playback the immersive video and/or immersive sound field. The computing device 80 (e.g., processors and/or memory) may be configured to perform calculations for rotating a sound field and/or an immersive video.

The computing device 80 may comprise a port 82. The port 82 may be configured to enable communications and/or power to be transmitted and/or received. The port 82 is shown connected to a wire 64 to enable communication with the network 62. The computing device 80 may comprise various input/output components to provide a human interface. The video output device 84, a keyboard 86, a pointing device 88 and the audio output devices 90a-90b are shown connected to the computing device 80. The keyboard 86 and/or the pointing device 88 may enable human input to the computing device 80.

The video output device 84 is shown displaying the interface 100. In an example, the video output device 84 may be implemented as a computer monitor. In some embodiments, the computer monitor 84 may be configured to enable human input (e.g., the video output device 84 may be a touchscreen device). In an example, the audio output devices 90a-90b may be implemented as computer speakers. In some embodiments, the computer speakers 90a-90b may be stereo speakers generally located in front of a user (e.g., next to the computer monitor 84). In some embodiments, the computer speakers 90a-90b may be configured to playback an immersive sound field. While two speakers are shown as the audio output devices 90a-90b, other audio output systems may be implemented (e.g., 5.1 surround sound, 7.1 surround sound, etc.).

The computing device 80 is shown as a desktop computer. In some embodiments, the computing device 80 may be a mini computer. In some embodiments, the computing device 80 may be a micro computer. In some embodiments, the computing device 80 may be a notebook (laptop) computer. In some embodiments, the computing device 80 may be a tablet computing device. In some embodiments, the computing device 80 may be a smart TV. In some embodiments, the computing device 80 may be a smartphone. The format of the computing device 80 and/or any peripherals (e.g., the display 84, the keyboard 86 and/or the pointing device 88) may be varied according to the design criteria of a particular implementation.

The audio capture device 92 may be configured to capture audio (e.g., sound) sources from the environment. Generally, the audio capture device 92 is located near the capture device 52. In some embodiments, the audio capture device may be a built-in component of the capture device 52. The audio capture device 92 is shown as a microphone. In some embodiments, the audio capture device 92 may be implemented as a microphone rig. For example, the audio capture device 92 may be configured as any type of ambisonic and/or 3D microphone. In some embodiments, the audio capture device 92 may be a sound field microphone configured to capture one or more audio sources from the environment. Generally, one or more of the audio capture device 92 may be implemented to capture audio sources from the environment. The implementation of the audio device 92 may be varied according to the design criteria of a particular implementation.

An example head-mounted playback device 94 is shown (e.g., an Oculus Rift, an HTC Vive, Google cardboard with a smartphone, etc.). In some embodiments, the head-mounted playback device 94 may implement the processing (e.g., video stitching, video encoding/decoding, audio encoding/decoding, etc.) functionality of the computing device 80. In some embodiments, the head-mounted playback device 94 may be configured to playback the immersive video and/or immersive sound field received from the computing device 80. The head-mounted playback device 94 is shown comprising the display 84' and the audio output devices 90a'-90b'. In an example, head-mounted playback device 94 may be used together with the keyboard 86, the mouse 88, a gamepad and/or another user input device to provide input to the computing device 80.

The head-mounted playback device 94 may receive motion input from a viewer. In an example, head movement by a user may be input for the head-mounted playback device 94 and in response to the head movement of the viewer the head-mounted playback device 94 may update the display 84'. The head-mounted playback device 94 and/or the audio output devices 90a'-90b' may be configured to perform binaural audio rendering (e.g., output audio from the sound field based on a direction the viewer is looking). With binaural rendering the sounds may appear to originate at an intended position for each of the audio sources (e.g., above, behind, left, etc.). Generally, the display 84' outputs a portion (e.g., a viewport) of the immersive video and the audio output devices 90a'-90b' plays a version of the sound field in response to the head movements of the viewer wearing the head-mounted playback device 94. The head-mounted playback device 94 may be configured to display and/or receive input for the interface 100.

The interface 100 may enable a user to playback and/or edit audio sources in a "3D" or "immersive" audio sound field relative to the immersive video (e.g., 360 degree video). The interface 100 may be a graphical user interface (GUI). The interface 100 may allow the user to play, pause, edit and/or modify the immersive view and/or audio associated with the immersive view. The interface 100 may be technology-agnostic. For example, the interface 100 may work with various audio formats (e.g., ambisonics, object-based audio, etc.) and/or video formats (e.g., spherical video, panoramic videos, cylindrical video, partial spherical video, etc.). A general functionality of the interface 100 for the head-mounted display device 94 may be similar to the interface 100 (e.g., the GUI and/or input options may be different for the head-mounted display device 94 to accommodate motion-based controls).

The interface 100 may be implemented as computer executable instructions. In an example, the interface 100 may be implemented as instructions loaded in the memory of the computing device 80. In another example, the interface 100 may be implemented as an executable application configured to run on the head-mounted playback device 94 (e.g., an Android app, an iPhone app, a Windows Phone app, etc.). In another example, the interface 100 may be implemented as an executable application configured to run on a smart TV (e.g., the video output device 84 configured to run an operating system such as Android). The implementation of the interface 100 may be varied according to the design criteria of a particular implementation.

The interface 100 may be implemented to enable monitoring (e.g., providing a preview) of live streaming of an immersive video stream (e.g., from the capture device 52). In an example, the interface 100 may provide a preview window to allow a user see what the final stitched video will look like after being rendered. In some embodiments, the interface 100 preview may display the immersive video through a viewport (e.g., not as a full equirectangular projection). For example, the viewport may provide a preview of what a viewer would see when viewing the video (e.g., on the head-mounted display 94, on YouTube, on other immersive video players, etc.). The user may interact with the interface 100 to identify an orientation of the sound field on a representation of the immersive video. In an example, the user may identify one or more axis ends of the sound field on the immersive video using the interface 100 (e.g., an intersection of an axis of the sound field with the immersive video) to determine an orientation of one or more axes. In another example, the user may identify one axis and a rotation of the sound field on the immersive video using the interface 100.

In some embodiments, the interface 100 may provide a preview window in a live video streaming application. For example, the interface 100 may be configured to preview video and/or audio in a real-time capture from the capture device 52 and/or pre-recorded files. The interface 100 may be used to aid in alignment of a 3D audio microphone such as the audio capture device 92. For example, a content creator may adjust the video by ear (e.g., turn the microphone 92 to hear what the viewer sees).

Figure 2:
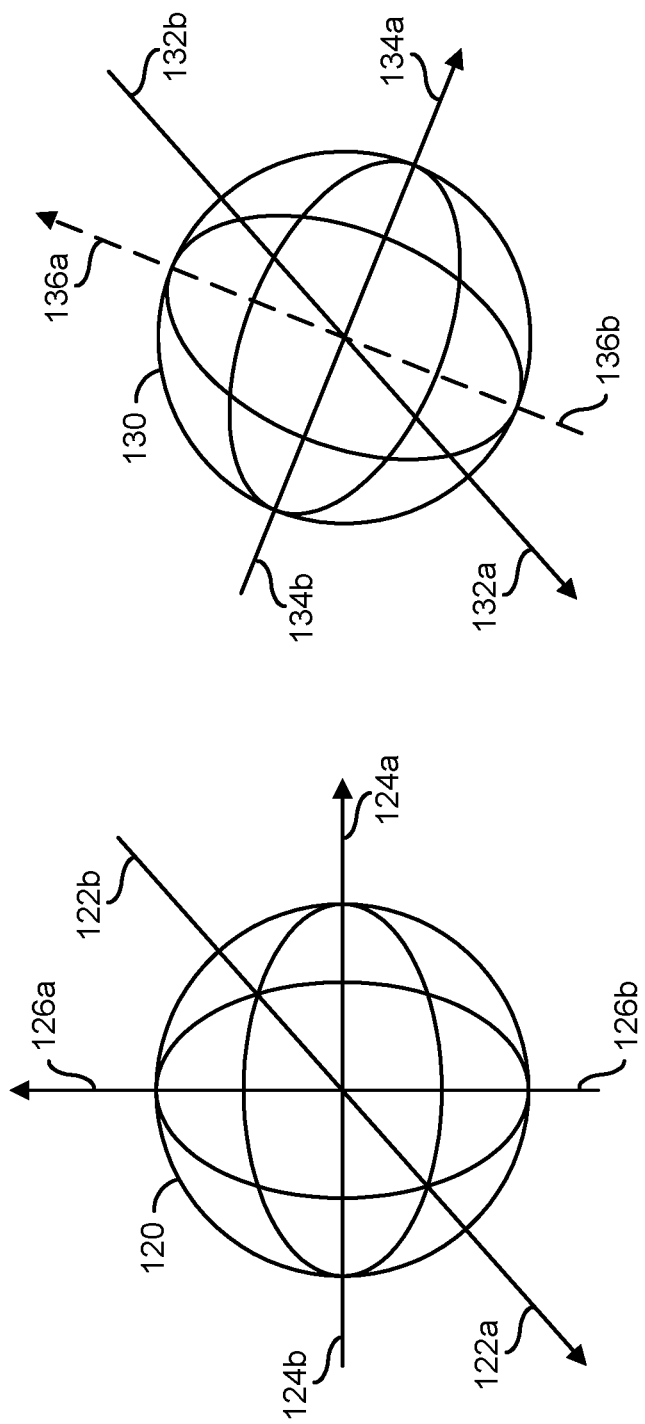
FIG. 2 is a diagram illustrating identifying axes to align a sound field to an immersive video.

Referring to FIG. 2, a representation of an immersive video 120 and an immersive sound field 130 are shown. As an example, the immersive video 120 and the immersive sound field 130 are shown as spheres (e.g., a spherical video and a spherical sound field). Other types of immersive videos and/or immersive sound fields may be implemented (e.g., panoramic, cylindrical, partial spheres, etc.). The sound field 130 is shown skewed compared to the immersive video 120. To match what is seen to what is heard, a content creator may use the interface 100 to align the sound field 130 to the immersive video 120. In some embodiments, the sound field 130 may be aligned with the immersive video 120 by identifying axes and/or ends of each axis.

The immersive video 120 is shown in reference to 3 axes (e.g., an X axis, a Y axis and a Z axis). An axis 122a-122b is shown (e.g., the X axis). The axis 122a-122b may comprise an axis end 122a and an axis end 122b. The axis end 122a may represent a frontal immersive video axis end. The axis end 122b may represent a back immersive video axis end. An axis 124a-124b is shown (e.g., the Y axis). The axis 124a-124b may comprise an axis end 124a and an axis end 124b. The axis end 124a may represent a right immersive video axis end. The axis end 124b may represent a left immersive video axis end. An axis 126a-126b is shown (e.g., the Z axis). The axis 126a-126b may comprise an axis end 126a and an axis end 126b. The axis end 126a may represent a top immersive video axis end. The axis end 126b may represent a bottom immersive video axis end.

The sound field 130 is shown in reference to 3 axes (e.g., an X axis, a Y axis and a Z axis). An axis 132a-132b is shown (e.g., the X axis). The axis 132a-132b may comprise an axis end 132a and an axis end 132b. The axis end 132a may represent a frontal sound field axis end. The axis end 132b may represent a back sound field axis end. An axis 134a-134b is shown (e.g., the Y axis). The axis 134a-134b may comprise an axis end 134a and an axis end 134b. The axis end 134a may represent a right sound field axis end. The axis end 134b may represent a left sound field axis end. An axis 136a-136b is shown (e.g., the Z axis). The axis 136a-136b may comprise an axis end 136a and an axis end 136b. The axis end 136a may represent a top sound field axis end. The axis end 136b may represent a bottom sound field axis end.

The axes 122a-122b, 124a-124b, 126a-126b, 132a-132b, 134a-134b and/or 136a-136b may be an oriented line. The axis ends 122a, 122b, 124a, 124b, 126a, 126b, 132a, 132b, 134a, 134b, 136a, and/or 136b may indicate how the coordinates of the respective axes 122a-122b, 124a-124b, 126a-126b, 132a-132b, 134a-134b and/or 136a-136b are ordered. For example, the axis end 132a may indicate where the coordinates along the axis 132a-132b are positive and the axis end 132b may indicate where the coordinates along the axis 132a-132b are negative. Similarly, the axis ends 122a, 122b, 124a, 124b, 126a, 126b, 132a, 132b, 134a, 134b, 136a, and/or 136b may indicate where the coordinates along the respective axes 122a-122b, 124a-124b, 126a-126b, 132a-132b, 134a-134b and/or 136a-136b are positive or negative with respect to an origin point (e.g., an origin of the axes).

In some embodiments, the content creator may identify the orientation of the sound field 130 by identifying two axes on the sound field 130 using the interface 100 to align the sound field 130 to the immersive video 120. The axis 132a-132b is shown as identified (e.g., represented by a solid line). In an example, the content creator may identify the frontal axis end 132a and/or the back axis end 132b of the sound field 130. The axis 134a-134b is shown as identified (e.g., represented by a solid line). In an example, the content creator may identify the right axis end 134a and/or the left axis end 134b of the sound field 130. The axis 136a-136n is shown as unidentified (e.g., represented by a dotted line).

The axis may be identified by locating an intersection of an axis end of the sound field 130 with the immersive video 120 and indicating which axis end the intersection corresponds to (e.g., top, bottom, front, etc.). Since two of the axes have been identified, identifying the axis 136a-136b may be unnecessary. Other combinations of axes and/or axis ends of the sound field 130 may be used to identify the orientation of the sound field 130. The two axes of the sound field 130 that are identified by the content creator using the interface 100 may be varied according to the design criteria of a particular implementation.

A rotation may be performed by the computing device 80 and/or the interface 100 to align the sound field 130 to the immersive video 120. In the example shown, the axis 132a-132b of the sound field 130 may be aligned with the axis 122a-122b of the immersive video 120 and a rotation (e.g., a roll about the X axis) may be applied to align the axes 134a-134b and 136a-136b with the axes 124a-124b and 126a-126b, respectively. The rotation applied to the sound field 130 to align the sound field 130 to the immersive video 120 may be varied according to the design criteria of a particular implementation. In some embodiments, the rotation may be applied to the immersive video 120.

To provide sufficient information to adjust the alignment between the immersive video 120 and the sound field 130, two axes of the immersive video and audio may be aligned. In one example, the content creator may efficiently identify the axes using the interface 100 by clicking (e.g., using the mouse 88) on two or more points corresponding to the axes (e.g., the axis 132a-132b and the axis 134a-134b) and/or the axis ends (e.g., the axis end 132a, 132b, 134a and/or 134c) of the sound field 130.

In some embodiments, an assumption may be made that the video capture device 52 and the audio capture device 92 are both oriented in the same position (e.g., upright) and are located on the same horizontal plane. When both the video capture device 52 and the audio capture device 92 are oriented in the same position and are located on the same horizontal plane, then identifying a single axis end of the sound field 130 in the immersive video 120 may be sufficient to identify the orientation and/or perform the alignment. When no assumption can be made, identifying two axis ends of the sound field 130 in the immersive video 120 may be sufficient to identify the orientation and/or perform the alignment. Generally, the origin of the axes of the sound field 130 and/or the origin of the axes of the immersive video 120 are aligned and fixed.

Figure 3:
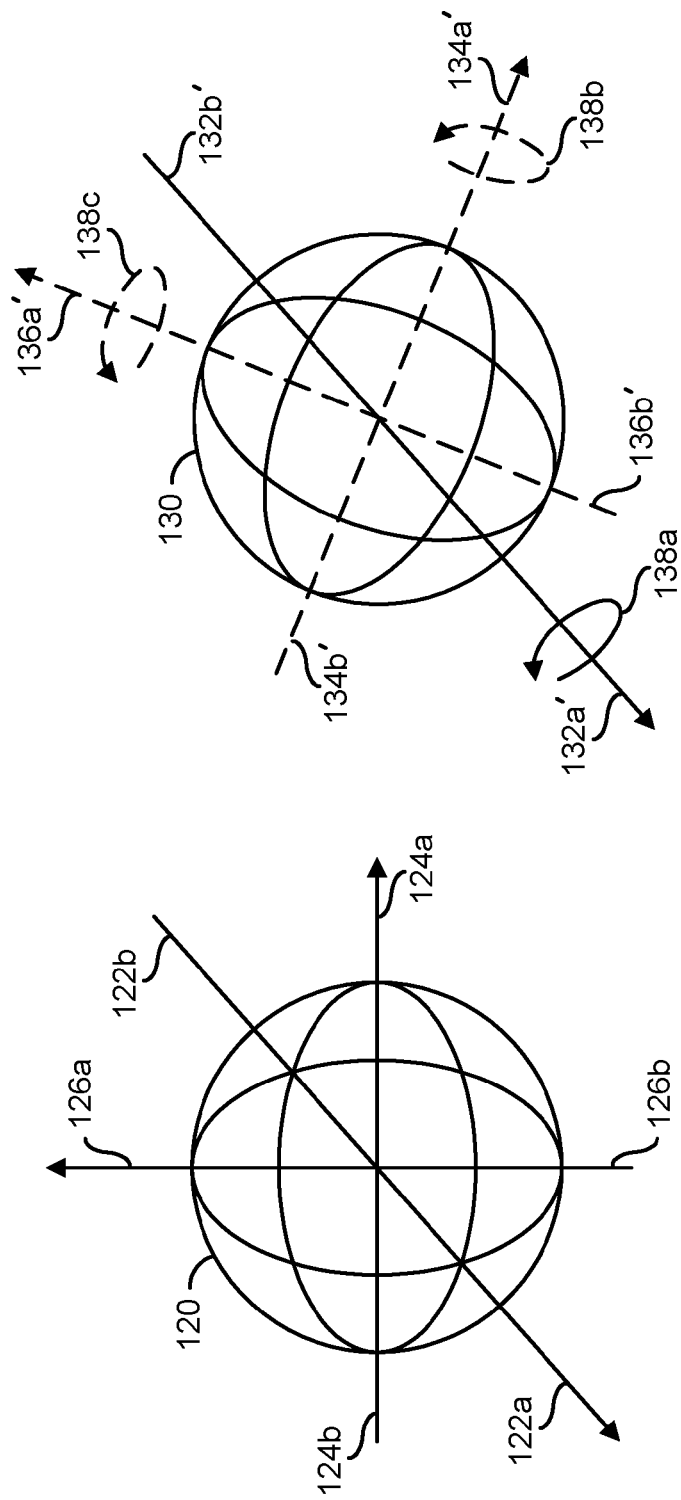
FIG. 3 is a diagram illustrating identifying an axis and a rotation to align a sound field to an immersive video.

Referring to FIG. 3, an alternate representation of the immersive video 120 and the sound field 130 are shown. In some embodiments, the sound field 130 may be aligned with the immersive video 120 by identifying one axis and a rotation. The immersive video 120 and the sound field 130 are shown having an arrangement and axes similar to the description in FIG. 2.

A rotation 138a is shown about the axis 132a'-132b' (e.g., the X axis representing the frontal axis end 132a' and the back axis end 132b' of the sound field 130). In an example, the rotation 138a may represent a roll. A rotation 138b is shown about the axis 134a'-134b' (e.g., the Y axis representing the right axis end 134a' and left axis end 134b' of the sound field 130). In an example, the rotation 138b may represent a pitch. A rotation 138c is shown about the axis 136a'-136b' (e.g., the Z axis representing the top axis end 136a' and the bottom axis end 136b' of the sound field 130). In an example, the rotation 138c may represent a yaw.

To identify an orientation of the sound field 130 with respect to the immersive video 120, a content creator may use the interface 100 to identify one axis and one rotation. The axis may be identified by locating the intersection of one of the axis ends of the sound field 130 with the immersive video 120 and indicating which axis end the intersection corresponds to (e.g., top, bottom, frontal, etc.). The axes 134a'-134b' and 136a'-136b' are shown as unidentified (e.g., each represented as a dotted line). The axis 132a'-132b' is shown as identified (e.g., represented as a solid line). In an example, the content creator may identify the axis 132a'-

132b' by identifying the frontal axis end 132a' and/or the back axis end 132b' using the interface 100. The rotations 138b and 138c are shown as unidentified (e.g., represented as dotted lines). The rotation 138a is shown as identified (e.g., represented as a solid line). With one axis (e.g., the axis 132a'-132b') and one rotation (e.g., 138a) identified, the computing device 80 and/or the interface 100 may align the sound field 130 with the immersive video 120. Other combinations of axes, axis ends and/or rotations may be used to determine the orientation of the sound field 130. The axes, axis ends and/or rotations identified may be varied according to the design criteria of a particular implementation.

To provide sufficient information to adjust the alignment between the immersive video 120 and the sound field 130, one axis and a rotation of the immersive video and audio may be identified. In one example, the content creator may efficiently identify the axis and the rotation using the interface 100 by clicking (e.g., using the mouse 88) on one point representing one axis end (e.g., the axis end 132a' and/or 132b') and rotating (e.g., dragging the mouse 88 to perform the rotation 138a) the sound field 130 around the identified axis 132a'-132b' to bring the other axes (e.g., the unidentified axes 134a'-134b' and 136a'-136b') into alignment with the immersive video 120.

Referring to FIG. 4, a system 110 is shown for applying a rotation as metadata to a bitstream comprising immersive data. The video capture device 52 is shown presenting a signal (e.g., VIDEO_IN) to the computing device 80. The audio capture device 92 is shown presenting a signal (e.g., AUDIO_IN) to the computing device 80. The computing device 80 is shown presenting a bitstream 112 to a playback device 114. The playback device 114 is shown comprising the display device 84 and the audio output device 90. In an example, the playback device 114 may be the head-mounted playback device 114. In another example, the playback device 114 may be the monitor 84 and the speakers 90a-90b. The implementation of the playback device 114 may be varied according to the design criteria of a particular implementation.

The computing device 80 and/or the interface 100 may be configured to determine a 3D rotation to be applied to the sound field 130 (or the immersive video 120) to align the sound field 130 with the immersive video 120. In some embodiments, the 3D rotation may be sent to the playback device 114 as metadata.

The computing device 80 may receive the signal VIDEO_IN and/or the signal AUDIO_IN. The signal VIDEO_IN may be image data (e.g., immersive video frames) and/or portions of image data captured by the camera 52. In some embodiments, the signal VIDEO_IN may be raw image data. In some embodiments, the signal VIDEO_IN may be video data encoded by the camera 52. In some embodiments, the signal VIDEO_IN may comprise video data from multiple lenses 56a-56n as separate (e.g., unstitched) video streams. The signal AUDIO_IN may comprise one or more audio streams captured by the microphone 92. In some embodiments, the signal AUDIO_IN may be raw audio data. In some embodiments, the signal AUDIO_IN may comprise encoded audio streams.

The computing device 80 may generate the bitstream 112 in response to the signal VIDEO_IN and/or the signal AUDIO_IN. The bitstream 112 is shown comprising a signal (e.g., VIDEO), a signal (e.g., AUDIO) and/or a signal (e.g., METADATA). The signal VIDEO may be the immersive video 120. In an example, the signal VIDEO may present the immersive video 120 before a rotation is applied to align the sound field 130 with the immersive video 120. In another example, the signal VIDEO may be an encoded and/or stitched version of the signal VIDEO_IN. In some embodiments, the signal VIDEO may comprise similar data as the signal VIDEO_IN. The signal AUDIO may be the sound field 130. In some embodiments, the signal AUDIO may be an encoded version of the signal AUDIO_IN. In some embodiments, the signal AUDIO may comprise similar data to the signal AUDIO_IN. In an example, the signal AUDIO may present the sound field 130 before a rotation to align the sound field 130 with the immersive video 120 is applied. The signal METADATA may be the metadata comprising information for performing the rotation of the sound field 130 and/or the immersive video 120.

The signal METADATA may be presented in a format readable by the playback device 114. In an example, the playback device 114 may provide an application programming interface (API) and parameters implemented in the signal METADATA may correspond to the API. Using the signal METADATA, the playback device 114 may be configured to perform the rotation to the sound field 130 and/or the immersive video 120 to align the sound field 130 to the immersive video 120. The signal METADATA may comprise various parameters transported in the bitstream 112. The parameters may be applied by the playback device 114, which may decode and/or render the sound field 130.

The signal METADATA may comprise one or more parameters. In an example, the parameters may comprise a yaw angle to apply to the immersive video 120 and/or to the audio sound field 130 to bring the immersive video 120 and the sound field 130 into alignment when both are leveled. In another example, the parameters may comprise the X coordinates of the intersection of a horizontal sound axis with the immersive video 120 when the immersive video 120 and the sound field 130 are leveled. In yet another example, the parameters may comprise yaw/pitch/roll angles to apply to the immersive video 120 and/or to the audio sound field 130 to bring both into alignment when the immersive video 120 and the sound field 130 are not leveled. In still another example, the parameters may comprise a quaternion number (e.g., a set of four scalar values) representing the 3D rotation to apply to the immersive video 120 and/or to the audio sound field 130 to bring both into alignment when the immersive video 120 and the sound field 130 are not leveled. In a further example, the parameters may comprise coordinates (e.g., polar, or X/Y coordinates) of the intersections of two sound axes (e.g., 132a-132b, 134a-134b, 136a-136b) with the immersive video 120. The types and/or number of the parameters in the signal METADATA may be varied according to the design criteria of a particular implementation.

Referring to FIG. 5, a system 110' is shown for applying a rotation to immersive data before transmission of a bitstream. The video capture device 52 is shown presenting the signal VIDEO_IN and a signal (e.g., METADATA_V) to the computing device 80. The audio capture device 92 is shown presenting the signal AUDIO_IN and a signal (e.g., METADATA_A) to the computing device 80. The computing device 80 is shown presenting the bitstream 112' to the playback device 114.

The video capture device 52 is shown comprising a block (or circuit) 116. The audio capture device 92 is shown comprising a block (or circuit) 118. The circuit 116 and/or the circuit 118 may comprise inertial sensors. The inertial sensor 116 may be configured to capture data corresponding to an orientation of the video capture device 52 while capturing video (e.g., the signal VIDEO_IN). The data captured by the inertial sensor 116 may be presented to the computing device 80 as the signal METADATA_V. The inertial sensor 118 may be configured to capture data corresponding to an orientation of the audio capture device 92 while capturing audio (e.g., the signal AUDIO_IN). The data captured by the inertial sensor 118 may be presented to the computing device 80 as the signal METADATA_A.

In an example, the signal METADATA_V may provide information to indicate that the video capture device 52 had an absolute orientation with a particular azimuth value and a particular elevation value when the signal VIDEO_IN was captured and the signal METADATA_A may provide information to indicate that the audio capture device 92 had an absolute orientation with a particular azimuth value and a particular elevation value when the signal AUDIO_IN was captured. In another example, the signal METADATA_V and/or METADATA_A may comprise data similar to the data in the signal METADATA (e.g., described in association with FIG. 4). The computing device 80 may be configured to use the data in the signal METADATA_V and/or METADATA_A to automatically (e.g., without user input) align the sound field 130 with the immersive video 120. The type and/or format of the data presented in the signal METADATA_V and/or METADATA_A may be varied according to the design criteria of a particular implementation.

In some embodiments, the computing device 80 may apply the rotation to the immersive video 120 and/or the sound field 130 in the editing software (e.g., the interface 100) before transmission. In one example, the interface 100 and/or the computing device 80 may apply the rotation automatically based on the signals METADATA_V and/or METADATA_A. In another example, the interface 100 and/or the computing device 80 may apply the rotation in response to input (e.g., identification of the orientation of the sound field 130 based on the axis ends 132*a*, 132*b*, 134*a*, 134*b*, 136*a* and/or 136*b*) from the user interacting with the interface 100.

The bitstream 112' is shown comprising a signal (e.g., VIDEO') and a signal (e.g., AUDIO'). The signal VIDEO' may be a rotated version of the immersive video 120. The signal AUDIO' may be a rotated version of the sound field 130. In some embodiments, only one of the signal VIDEO' and AUDIO' may be rotated. In some embodiments, both of the signal VIDEO' and AUDIO' may be rotated. Generally, the rotation applied by the computing device 80 to the signal VIDEO' and/or the signal AUDIO' may be selected to align the immersive video 120 with the sound field 130.

Referring to FIG. 6, a graphical representation 150 on the interface 100 for identifying an axis for the sound field 130 (shown in FIG. 2) on the immersive video 120 (shown in FIG. 2) is shown. The equirectangular projection 150 may be a 2D projection of the entire immersive field of view 120. In some embodiments, the equirectangular projection 150 may be displayed on the video output device 84 as part of the interface 100. In an example, viewing the equirectangular projection 150 may be useful to a content creator. The equirectangular projection 150 may provide a distorted version of the captured environment (e.g., the distortion may be due to projecting the immersive video onto a 2D representation such as the display 84). A location of one or more axis ends of the immersive video 120 and/or the sound field 130 may be determined based on a latitude and/or longitude corresponding to the equirectangular projection 150.

Audio sources 152*a*-152*b* are shown on the equirectangular projection 150. In an example, the audio source 152*a* may be a person speaking. In another example, the audio source 152*b* may be a bird call. The audio sources 152*a*-152*b* may be captured by the audio capture device 92 (e.g., the audio sources 152*a*-152*b* may generate audio signals captured by the audio capture device 92). In some embodiments, locations of the audio sources 152*a*-152*b* may be determined by data provided by the audio capture device 92. In one example, the location of the audio sources 152*a*-152*b* may be provided using an ambisonic format (e.g., based on B-format equations). In another example, the location of the audio sources 152*a*-152*b* may be provided using an object-audio format (e.g., based on metadata coordinates). The number and/or types of audio sources in the immersive video may be varied according to the design criteria of a particular implementation.

An object 154 is shown. The object 154 may be used as a reference object. In an example, the content creator may interact with the interface 100 (e.g., click the mouse 88) and identify the reference object 154. The reference object 154 may be used to determine an orientation of the sound field 130 with respect to the immersive video 120 (e.g., in the equirectangular projection 150). The type, size and/or location of the reference object 154 may be varied.

A vertical axis 160, a vertical axis 162 and a vertical axis 164 are shown overlaid on the equirectangular projection 150. The vertical axis 160 may correspond to a longitude angle $-\pi$. The vertical axis 162 may correspond to a longitude angle 0. The vertical axis 164 may correspond to a longitude angle $\pi$. The orientation angles may have a longitude angle value between $-\pi$ and $\pi$. The vertical axis 160, 162 and/or 164 may be an optional graphical indicator to show the longitude values on the graphical representation 150.

A horizontal axis 170, a horizontal axis 172 and a horizontal axis 174 are shown overlaid on the equirectangular projection 150. The horizontal axis 170 may correspond to a latitude angle $\pi/2$. The horizontal axis 172 may correspond to a latitude angle 0. The horizontal axis 174 may correspond to a latitude angle $-\pi/2$. The orientation angles may have a longitude angle value between $-\pi/2$ and $\pi/2$. The horizontal axis 170, 172 and/or 174 may be an optional graphical indicator to show the latitude values on the graphical representation 150.

In some embodiments, a human operator (e.g., the content creator) may know which visual object the frontal direction (e.g., the frontal axis end 132*a*) of the sound field 130 points to. The visual object that the frontal direction of the sound field 130 points to may be identified by the content creator as the reference object 154. In an example, the visual object that the frontal direction of the sound field 130 points to may be known when the microphone 92 specifies where the front is and someone noted where the front of the microphone 92 was pointing during the capture of the immersive video 120 and the sound field 130. In an another example, the visual object that the frontal direction of the sound field 130 points to may be known if someone is recorded on the video clapping on the frontal microphone axis 132*a* end (e.g., using a clapperboard as is routinely done in movie productions).

In some embodiments, an assumption may be made that the microphone 92 and the video capture device 52 share the same horizontal plane (e.g., are located on the same flat surface) and are oriented in the same position (e.g., an upright orientation). In an example, when capturing the immersive video 120 and/or the sound field 130, a filming crew may ensure the microphone 92 and/or the capture device 52 are both on a flat and leveled surface in a real scene. In some embodiments, if the camera 52 and/or the microphone 92 cannot be leveled, the camera 52 and/or the microphone 92 may be associated with the sensor 116 and 118 (e.g., a gyroscope, a magnetometer, etc.). Information from the sensor 116 and/or 118 may be used by the computing device 80 and/or the interface 100 to determine a tilt angle and/or perform a horizon correction of the video and/or sound acquisition. In some embodiments, mounting constraints may cause the microphone 92 and/or the camera 52 to not have the same vertical orientation (e.g., the microphone 92 may be hanging upside down).

The computing device 80 and/or the interface 100 may be configured to flip the sound field 130 and/or the immersive video 120 to compensate for the differences in orientation. Generally, when the microphone 92 and the video capture device 52 are on the same horizontal plane, determining the longitude of one of the horizontal axes (e.g., the front/back axis 132a-132b or the left/right axis 134a-134b) may provide enough information for the computing device 80 and/or the interface 100 to align the sound field 130 and immersive video 120. When the microphone 92 and the video capture device 52 are on the same horizontal plane, the horizontal axes may have the same latitude, but not the same longitude.

To perform the alignment, the human operator may identify a reference object (e.g., the reference object 154) in the projected immersive video 150 (e.g., clicking on the reference object 154, tapping a touchscreen, etc.). The reference object 154 may be an example of an object identified as being aligned with the front of the microphone 92 during the take (e.g., while filming). In the example shown, the reference object 154 is a bag on the ground. In some embodiments, the reference object 154 may be an audio source (e.g., one of the audio sources 152a-152b). In some embodiments, the reference object 154 may not make sound. In some embodiments, the reference object 154 may not be a physical object. In an example, the reference object 154 may be a position noted by the filming crew that corresponds to an axis of the audio capture device 92.

The computing device 80 and/or the interface 100 may determine the coordinates (e.g., X, Y) of the point corresponding to the identified reference object 154. The computing device 80 and/or the interface 100 may translates the value of X into a longitude value and/or the value of Y into a latitude value. An icon 180 is shown at the longitude corresponding to the reference object 154 (e.g., approximately $-\pi/3$), and at a latitude of 0 (e.g., on the axis 172). For example, the icon 180 may be located at a latitude of zero because the microphone 92 and the camera 52 are located in the same horizontal plane. In the example shown, the identification of the orientation of the sound field 130 is determined with respect to the frontal axis end 132a. However, the identification of the orientation of the sound field 130 may be determined with respect to any of the axis ends (e.g., the frontal axis end 132a, the back axis end 132b, the right axis end 134a, the left axis end 134b, the top axis end 136a and/or the bottom axis end 136b).

Referring to FIG. 7, a graphical representation 150' on the interface 100 identifying multiple axes for the sound field 130 (shown in FIG. 2) on the immersive video 120 (shown in FIG. 2) is shown. The interface 100 is shown providing visual feedback based on the identification of the orientation of the sound field 130. The icon 180 is shown. Icons 182a-182e are shown. Arrows 184a-184b are shown. Additional graphics (e.g., icons) may be generated by the interface 100 to represent the identification of the orientation of the sound field 130.

The interface 100 may provide various types of visual feedback to the content creator. In one example, a graphical marker such as the icon 180 may be placed at the identified longitude (e.g., corresponding to the reference object 154) and zero latitude. In another example, graphical markers represented by the icons 182a-182e may be generated to display the identification of the intersection of the left (e.g., negative Y direction) axis 134b (e.g., the icon 182a), the top (e.g., positive Z direction) axis end 136a (e.g., the icon 182b), the right (e.g., positive Y direction) axis end 134a (e.g., the icon 182d), the bottom (e.g., negative Z direction) axis end 136b (e.g., the icon 182c), the front (e.g., positive X direction) axis end 132a (e.g., the icon 180) and/or the back (e.g., negative X direction) axis end 132b (e.g., the icon 182e) with the immersive video 120. In yet another example, graphical markers represented as the arrows 184a-184b may be generated to display the identification of the left (e.g., negative Y direction) axis end 134b (e.g., the icon 184a) and the top (e.g., positive Z direction) axis end 136a (e.g., the icon 184b). The color, size and/or shape of the graphical representations of the identification of the orientation of the sound field 130 may be varied according to the design criteria of a particular implementation.

The axis ends 132a and/or 132b may represent an intersection of the X axis of the sound field 130 with the immersive video 120. The axis ends 134a and/or 134b may represent an intersection of the Y axis of the sound field 130 with the immersive video 120. The axis ends 136a and/or 136b may represent an intersection of the Z axis of the sound field 130 with the immersive video 120.

The content creator may use the interface 100 to identify one or more of the axis ends 132a, 132b, 134a, 134b, 136a and/or 136b on the graphical representation 150' of the immersive video 120. Identifying the axis ends may comprise a location and which axis end the location corresponds to (e.g., how the axis is ordered). In an example, the icon 180 may represent an identification of an intersection of the frontal axis end 132a with the equirectangular representation 150' of the immersive video 120. The user may click on the location of the icon 180 and identify the location as the frontal axis end 132a. In another example, the icon 182a may represent an identification of an intersection of the left axis end 134b with the equirectangular representation 150' of the immersive video 120. The user may click on the location of the icon 182a and identify the location as the left axis end 134b.

In an example, identifying the axis end 136a (e.g., the icon 182b) and the axis end 136b (e.g., the icon 182c) may identify where the axis 136a-136b (e.g., the vertical axis of the sound field 130) intersects with the immersive video 120 and how the axis 136a-136b is ordered. Using the interface 100, identifying one of the axis ends and identifying which axis end has been identified may provide sufficient information to determine an orientation of the corresponding axis. Since the origin of the axis and the origin of the sound field 130 (e.g., a sphere) are located at the same point, an assumption may be made (e.g., the axis passes through the origin and the opposite axis end may be on the opposite side of the sound field 130). In an example, identifying the axis end 136a at the location of the icon 182b and identifying that the icon 182b corresponds to the top axis end may provide sufficient information for the computing device 80 and/or the interface 100 to determine an orientation of the vertical (e.g., Z) axis with respect to the immersive video 120. Without identifying which axis end the location corresponds to, the computing device 80 and/or the interface 100 may not know whether to flip the axis or not. In some embodiments, the interface 100 may generate a label to display the identification for the axis ends (e.g., the label 'frontal axis end' may be generated near the icon 180 to provide visual feedback of the identification of the frontal axis end 132a). In some embodiments, the icons 180 and/or 182a-182e may each have a different design and/or shape corresponding to the axis end represented by the icon.

Figure 8:
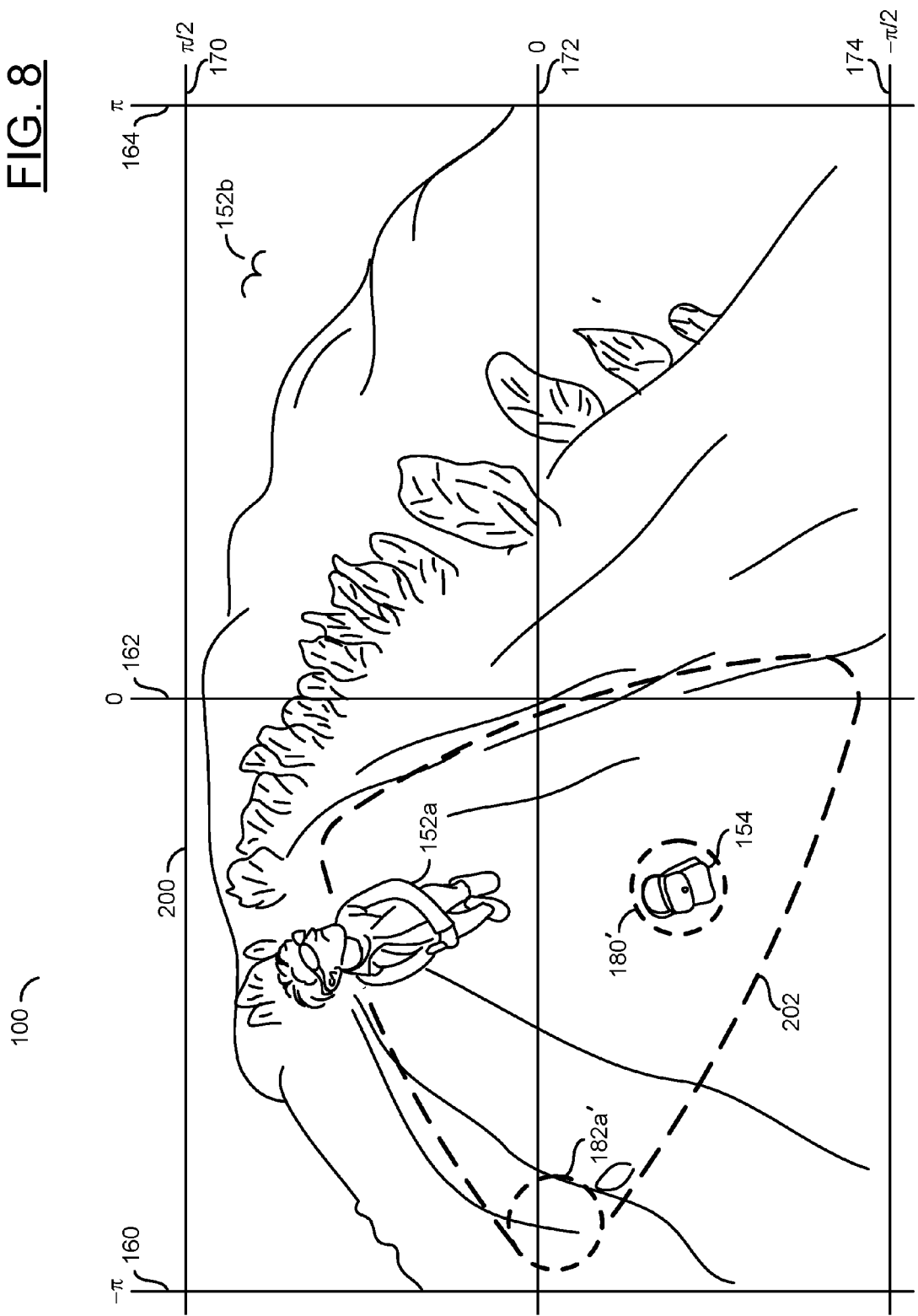
FIG. 8 is a diagram illustrating a graphical representation on an interface for rotating an axis for a sound field on an immersive video.

Referring to FIG. 8, a graphical representation 200 on the interface 100 for rotating an axis for the sound field 130 (shown in FIG. 3) on the immersive video 120 (shown in FIG. 3) is shown. In some embodiments, the video capture device 52 and the audio capture device 92 may not be on the same horizontal plane (e.g., the assumption that the latitude may be zero may not be valid). When the camera 52 and the microphone 92 are not on the same plane, the orientation of the sound field 130 and the immersive video 120 may be identified by locating two microphone axes of the sound field 130 in the immersive video 120.

An icon 180' is shown at the reference object 154. Since the camera 52 and the microphone 92 may not be on the same horizontal plane, the longitude of the intersection of the axis of the sound field 130 (e.g., the frontal axis 132a, the back axis 132b, the right axis 134a, the left axis 134b, the top axis 136a and/or the bottom axis 136b) with the immersive video 120 may not be assumed to have the same latitude (a latitude of 0 as shown by the icon 180 in FIG. 6). In the example shown, the icon 180' may be identified at a location having approximately a longitude of $-\pi/3$ and a latitude of $-\pi/4$. In an example, the icon 180' may represent an identification of the front axis end 132a of the sound field 130. After identifying a first axis end of the sound field 130, the content creator may identify a second reference point. In an example, the second reference point may correspond to the left side of the microphone 92. In the example shown, the icon 182a' may correspond with the intersection of the left axis end 134b of the sound field 130 and the immersive video 120.

In some embodiments, once the first axis end is identified in the view (e.g., the reference point 180') the interface 100 may be used to rotate the immersive sound field 130 around the axis. In an example, the 3D sphere of the sound field 130 may be rotated around the identified front/back axis 132a-132b. The "free" axes (e.g., the axes 134a-134b and/or 136a-136b) may rotate around the front/back axis 132a-132b and may be constrained to intersect the immersive video 120 on a particular path (e.g., a particular circle). For example, the computing device 80 and/or the interface 100 may be configured to determine the path of the rotation of the free axes and/or constrain the identification (e.g., placement of graphical representations) of the free markers (e.g., the left/right and/or top/bottom axis ends) representing the intersections of the axis ends of the sound field 130 with the immersive video 120.

A path 202 is shown. The point 182a' is shown on the path 202. The path 202 may be an example 3D circular locus. The 3D circular locus may be used to constrain the placement of a reference point representing an intersection of an axis of the sound field 130 (e.g., the axis end) and the immersive video 120. Projected into the equirectangular view 200, the second reference point may be constrained to lie on a particular (e.g., pre-determined) curve. In the example shown, the frontal end 132a' and the left axis end 134b' may be adjusted by moving the points 180' and 182a' in the view 200.

A first reference point may be placed freely using the interface 100. For example, the icon 180' may represent the frontal axis end 132a' on the reference object 154. A second reference point may be constrained to rotate around the first reference point on the 3D circular locus 202. In one example, the interface 100 may assist the user by making the icon 182a' (e.g., representing the left axis end 134b') slide along the locus 202. In another example, the interface 100 may assist the user by overlaying the full locus curve 202 (or parts of the locus curve 202) onto the projected video 200. In some embodiments, all of the axis ends (e.g., the frontal axis end 132a', the back axis end 132b', the right axis end 134a', the left axis end 134b', the top axis end 136a' and/or the bottom axis end 136b') may be represented on the projected video 200 (e.g., by the graphical representations 182a-182e).

Figure 9:
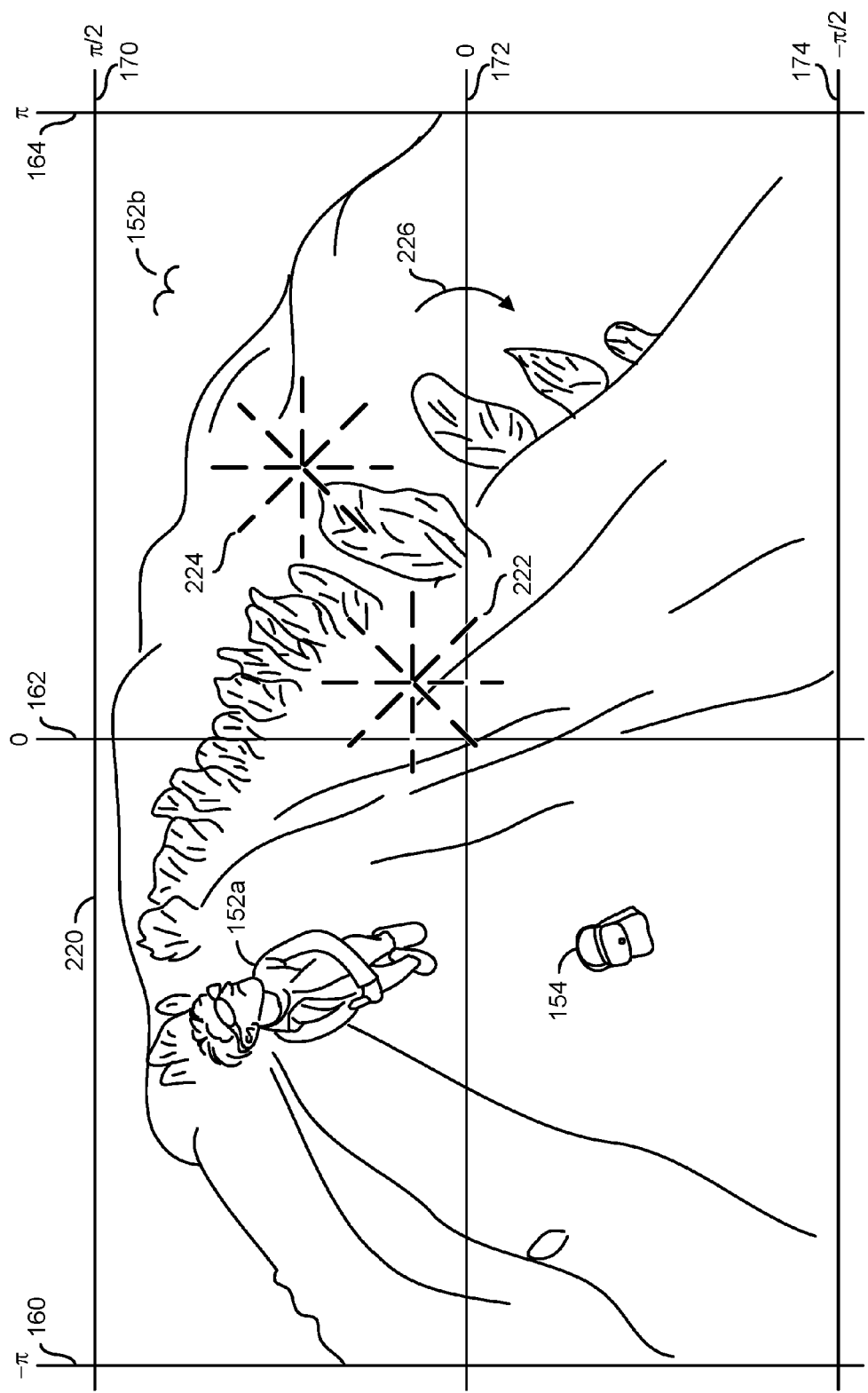
FIG. 9 is a diagram illustrating a graphical representation on an interface for identifying peak audio for a sound field on an immersive video.

Referring to FIG. 9, a graphical representation 220 on the interface 100 for identifying peak audio for the sound field 130 (shown in FIG. 3) on the immersive video 120 (shown in FIG. 3) is shown. An audio peak 222 and an audio peak 224 are shown displayed on the graphical representation 220. A rotation icon 226 is shown displayed on the graphical representation 220. The audio peak 222, the audio peak 224 and/or the rotation icon 226 may be generated by the interface 100. The number of audio peaks displayed by the interface 100 may be varied according to the design criteria of a particular implementation.

In some embodiments, the human operator (e.g., the content creator) may be presented with the immersive visual representation 220 of the location of the audio peaks (e.g., the audio peak 222 and the audio peak 224) of the sound field 130. In an example, the computing device 80 and/or the interface 100 may perform an audio analysis of the sound field 130 to determine the audio peaks. For example, the audio peaks 222 and 224 may correspond to claps, talking people, sound effects and/or any type of sound source. The interface 100 may superimpose the audio peak 222 and the audio peak 224 on the graphical representation 220 of the immersive video 120. Using the interface 100, the content creator may adjust the orientation of the camera 52 and/or the microphone 92 so that the immersive video 120 and the sound field 130 coincide.

Using the interface 100, the content creator may shift the location of the first audio peak 222. In an example, the content creator may use the mouse 88, the keyboard 86, a touchscreen display 84 and/or a gamepad to move the location of the first audio peak 222. After adjusting the location of the first audio peak 222, the content creator may rotate a location of the second audio peak 224. The second audio peak 224 may be rotated around the first audio peak 222 to bring the sound field 130 and immersive video 120 into alignment. The rotation icon 226 may provide visual feedback to indicate that the mouse 88 may be clicked and dragged to rotate the location of the second audio peak 224. The input for rotating the second audio peak 224 may be varied according to the design criteria of a particular implementation.

Figure 10:
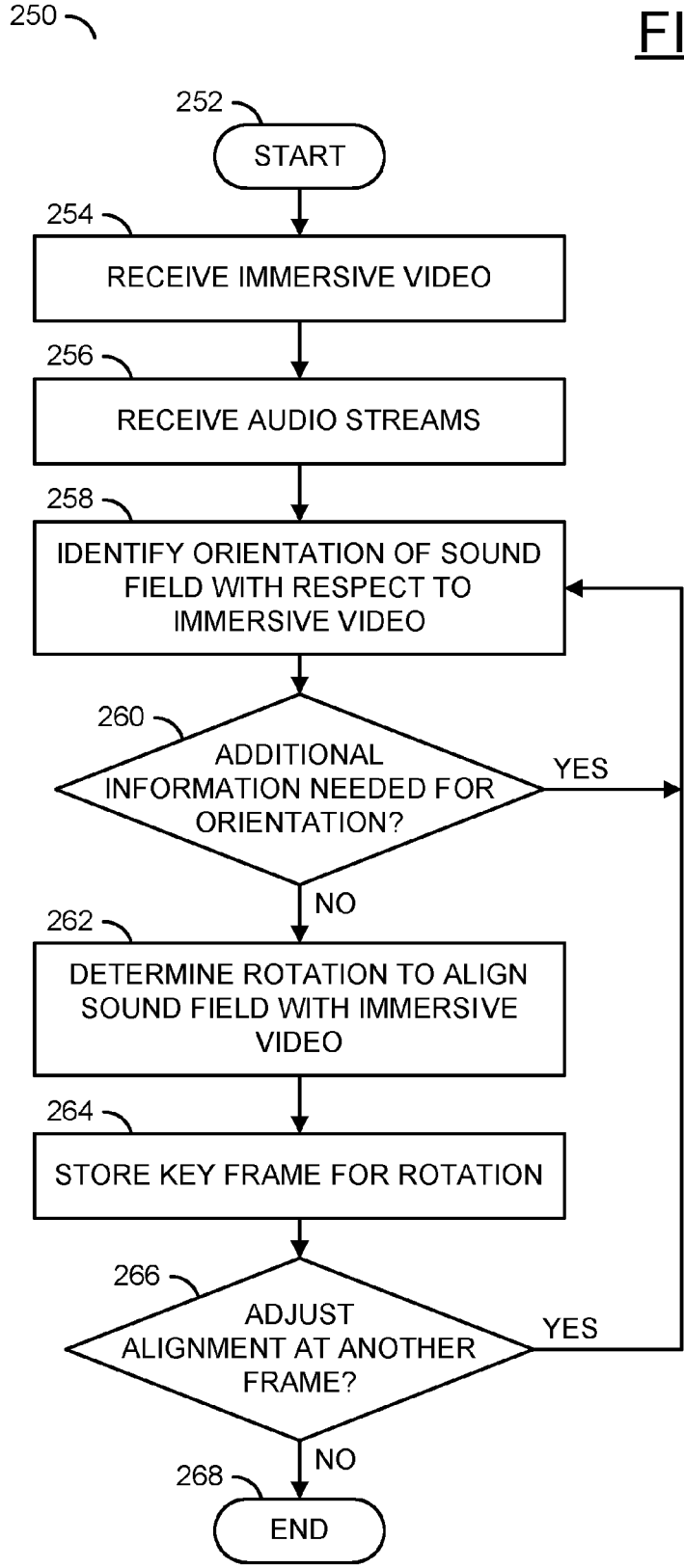
FIG. 10 is a flow diagram illustrating a method for aligning a sound field with an immersive video.

Referring to FIG. 10, a method (or process) 250 is shown. The method 250 may align a sound field with an immersive video. The method 250 generally comprises a step (or state) 252, a step (or state) 254, a step (or state) 256, a step (or state) 258, a decision step (or state) 260, a step (or state) 262, a step (or state) 264, a decision step (or state) 266, and a step (or state) 268.

The state 252 may start the method 250. In the state 254, the computing device 80 may receive the immersive video (e.g., VIDEO_IN) from the video capture device 52. In the state 256, the computing device 80 may receive the audio streams (e.g., AUDIO_IN) from the audio capture device 92. Next, in the state 258, the interface 100 (or the computing device 80 using the data from the inertial sensor 116 and/or 118) may be used identify the orientation of the immersive sound field 130 with respect to the immersive video 120. Next, the method 250 may move to the decision state 260.

In the decision state 260, the computing device 80 and/or the interface 100 may determine whether additional information is needed to determine the orientation of the sound field 130 with respect to the immersive video 120. If additional information is needed, the method 250 may return to the state 258. If additional information is not needed, the method 250 may move to the state 262. In the state 262, the computing device 80 and/or the interface 100 may determine a rotation to align the sound field 130 with the immersive video 120. Next, in the state 264, the computing device 80 may store a key frame corresponding to the rotation. Next, the method 250 may move to the decision state 266.

In the decision state 266, the computing device 80 and/or the interface 100 may determine whether to adjust an alignment of the sound field 130 and/or the immersive video 120 at another frame of the immersive video 120. If another frame will be adjusted, the method 250 may return to the state 258. If another frame will not be adjusted, the method 250 may move to the state 268. The state 268 may end the method 250.

Figure 11:
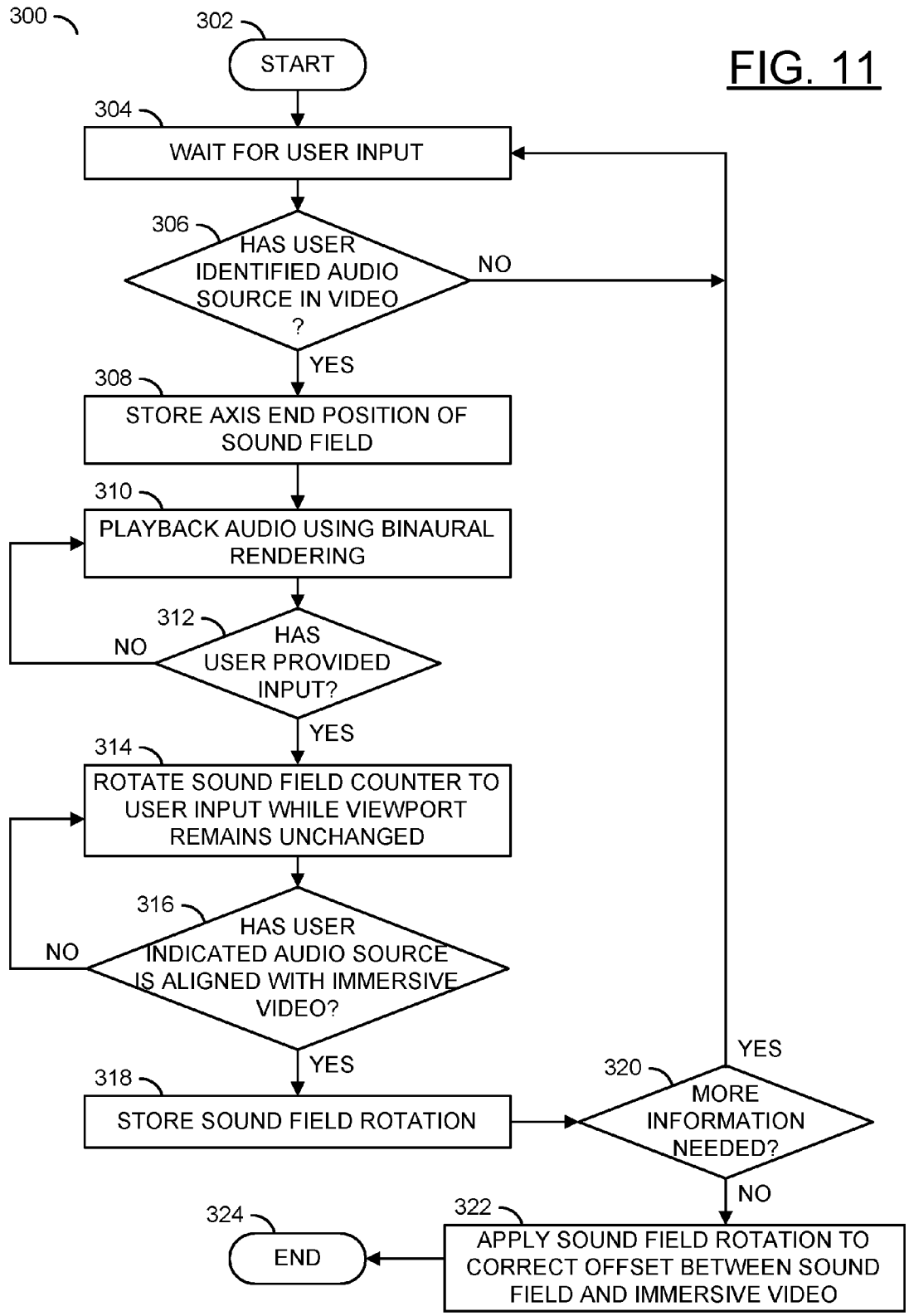
FIG. 11 is a flow diagram illustrating a method for identifying an orientation of the sound field using a head-mounted playback device.

Referring to FIG. 11, a method (or process) 300 is shown. The method 300 may identify an orientation of the sound field using the head-mounted playback device 94. The method 300 generally comprises a step (or state) 302, a step (or state) 304, a decision step (or state) 306, a step (or state) 308, a step (or state) 310, a decision step (or state) 312, a step (or state) 314, a decision step (or state) 316, a step (or state) 318, a decision step (or state) 320, a step (or state) 322, and a step (or state) 324.

The state 302 may start the method 300. In the state 304, the head-mounted playback device 94 may wait for user input. Next, the method 300 may move to the decision state 306. In the decision state 306, the head-mounted playback device 94 and/or the computing device 80 may determine whether the user has identified the audio source (e.g., 152*a*, 152*b*, etc.) in the immersive video 120. The audio source may be identified by the user moving his/her head to bring the audio source in the immersive video 120 to a frontal position and then providing input (e.g., clicking on the location in the immersive video 120) to identify the position of the audio source in the immersive video 120. If the user has not identified the audio source in the immersive video 120, the method 300 may return to the state 304. If the user has identified the audio source in the immersive video 120, the method 300 may move to the state 308. In the state 308, the computing device 80 and/or the playback device 94 may store the axis end positions of the sound field 130. Next, the method 300 may move to the decision state 310. In the state 310, the audio playback device 90*a*'-90*b*' of the head-mounted playback device 94 may playback the immersive audio using binaural rendering. Playing back the immersive audio using binaural rendering may allow the user to perceive the sounds. Next, the method 300 may move to the decision state 312.

In the decision state 312, the head-mounted playback device 94 and/or the computing device 80 may determine whether the user has provided input (e.g., detected a head movement). If an input has not been detected, the method 300 may return to the state 310. If an input has been detected, the method 300 may move to the state 314. In the state 314, the head-mounted playback device 94 and/or the computing device 80 may rotate the sound field 130 counter to the user input while the viewport shown on the display 84' remains unchanged. In an example where the user makes a head movement 10 degrees to the left, the viewport shown on the display 84' may remain static and the sound field 130 may be rotated 10 degrees to the right. Next, the method 300 may move to the decision state 316.

In the decision state 316, the head-mounted playback device 94 and/or the computing device 80 may determine whether the user has indicated the audio source (e.g., the immersive sound field 130) is aligned with the immersive video 120. For example, the user may provide an input (e.g., press a key on the keyboard 86, use the mouse 88 and/or provide an input using sensor-based controls of the head-mounted playback device 94) when what the user sees is aligned (or coherent) with what the user hears. If the user does not indicate that the immersive video 120 and the immersive audio 130 are aligned, the method 300 may return to the state 314. If the user does indicate that the immersive video 120 and the immersive audio 130 are aligned, the method 300 may move to the state 318.

In the state 318, the head-mounted playback device 94 and/or the computing device 80 may store the rotation of the sound field 130 (e.g., the rotation when the user indicated that the immersive video 120 and the immersive audio 130 were aligned). Next, the method 300 may move to the decision state 320. In the decision state 320, the computing device 80 and/or the playback device 94 may determine whether more information is needed (e.g., to identify another one of the axis ends of the immersive video 120). If more information is needed, the method 300 may return to the state 304. If more information is not needed, the method 300 may move to the state 322. In the state 322, the head-mounted playback device 94 and/or the computing device 80 may apply the rotation to the sound field 130 to correct an offset between the sound field 130 and the immersive video 120 (e.g., using the rotation stored in the state 318). Next, the method 300 may move to the state 324. The state 324 may end the method 300.

To perform the alignment technique in the states 310-318 of the method 300, the viewport of the immersive video 120 displayed on the display 84' should not change with the head movement of the user. Generally, when using the head-mounted playback device 94, the viewport is updated as the user adjusts the input using head movements (e.g., looking to the right rotates the immersive video to the right). However, when performing the alignment of the states 310-318 of the method 300 the audio source (e.g., the person 152*a*) may remain static in the center of the viewport while the user provides head movement input to "find" the voice of the person talking while listening to and/or rotating the sound field 130. For example, with the alignment technique of the states 310-318 of the method 300, the user input may rotate the sound field 130 instead of the immersive video 120.

The alignment technique of the method 300 may be performed in any order. In one example, the alignment technique of the method 300 may guide the user to first select the position of the audio source in the sound field 130 (e.g., the states 310-318) and then guide the user to select the position of the audio source in the immersive video 120 (e.g., the states 304-308). In another example, the alignment method 300 may guide the user to first select the position of the audio source in the immersive video 120 (e.g., the states 304-308) and then guide the user to select the position of the audio source in the sound field 130 (e.g., the states 310-318). When identifying the position of the audio source in the immersive video 120, the interface 100 may provide the user with the full sphere in the equirectangular projection and/or motion-tracked headphones may be used for the audio reproduction (e.g., the audio output device 90*a*'-90*b*'). The order of the states of the method 300 may be varied according to a preference of the user and/or the design criteria of a particular implementation.

Figure 12:
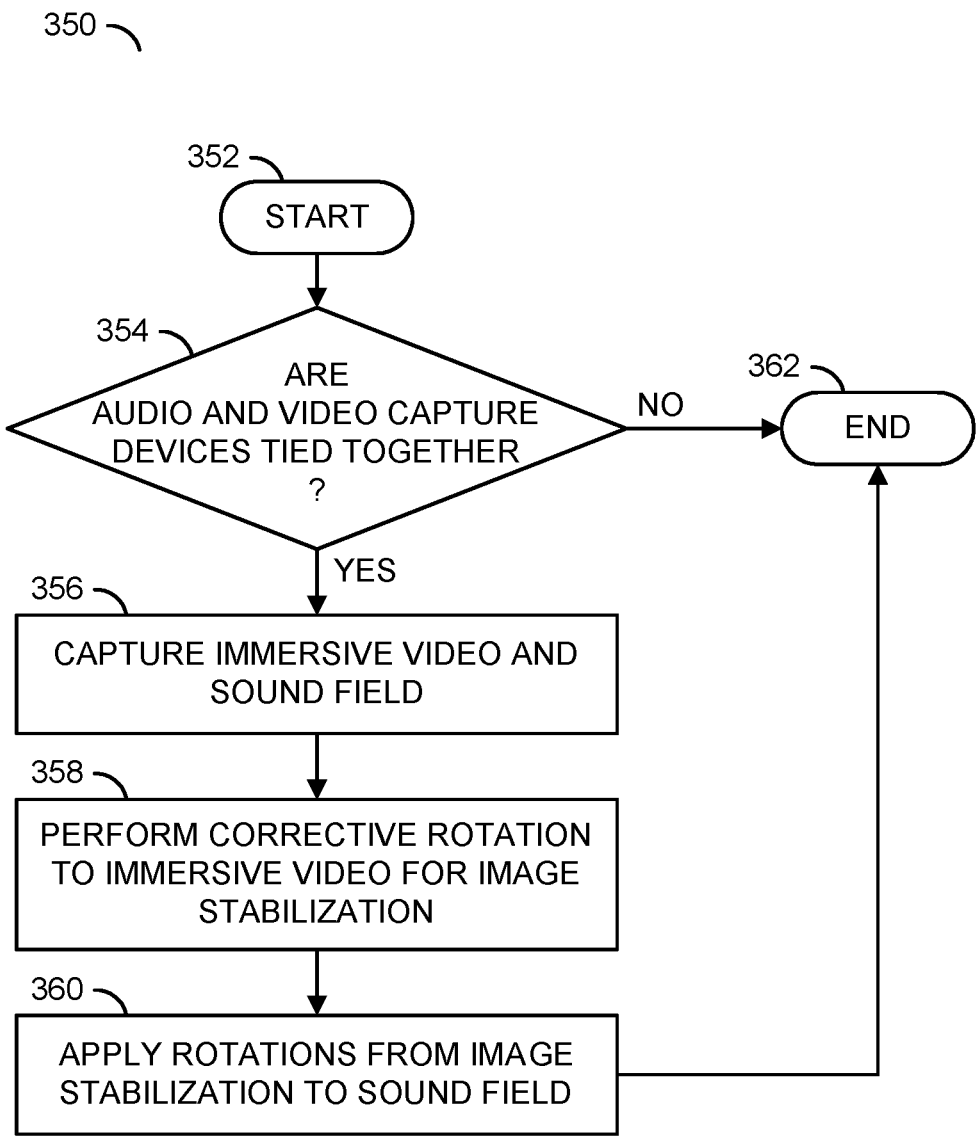
FIG. 12 is a flow diagram illustrating a method for aligning a sound field based on image stabilization.

Referring to FIG. 12, a method (or process) 350 is shown. The method 350 may align a sound field based on image stabilization. The method 350 generally comprises a step (or state) 352, a decision step (or state) 354, a step (or state) 356, a step (or state) 358, a step (or state) 360, and a step (or state) 362.

The state 352 may start the method 350. Next, the method 350 may move to the decision state 354. In the decision state 354, the computing device 80 and/or the interface 100 may determine whether the video capture device 52 and the audio capture device 92 are tied together (e.g., implemented as an audio/video rig). If the video capture device 52 and the audio capture device 92 are not tied together, the method 350 may move to the state 362. If the video capture device 52 and the audio capture device 92 are tied together, the method 350 may move to the state 356.

In the state 356, the video capture device 52 and the audio capture device 92 may capture the immersive video 120 and the immersive sound field 130 (e.g., the signal VIDEO_IN and the signal AUDIO_IN). Next, in the state 358, the computing device 80 and/or the interface 100 may perform a corrective rotation to the immersive video 120 for image stabilization (e.g., generate the signal VIDEO). Next, in the state 360, the computing device 80 and/or the interface 100 may apply the rotations from the image stabilization to the sound field 130. Next, the method 350 may move to the state 362. The state 362 may end the method 350.

Figure 13:
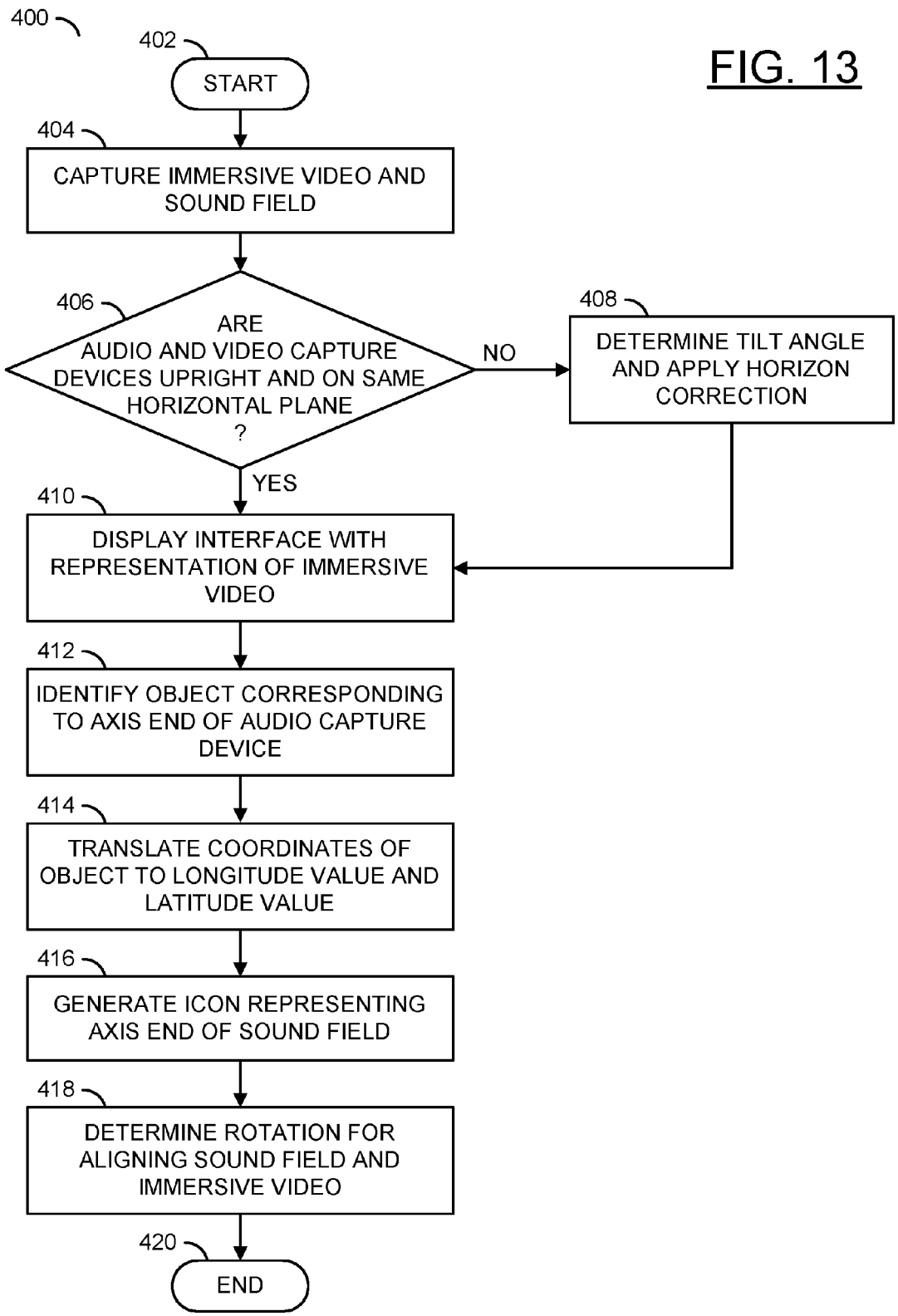
FIG. 13 is a flow diagram illustrating a method for generating visual feedback for identifying an orientation of a sound field on a graphical representation of an immersive video.

Referring to FIG. 13, a method (or process) 400 is shown. The method 400 may generate visual feedback for identifying an orientation of a sound field on a graphical representation of an immersive video. The method 400 generally comprises a step (or state) 402, a step (or state) 404, a decision step (or state) 406, a step (or state) 408, a step (or state) 410, a step (or state) 412, a step (or state) 414, a step (or state) 416, a step (or state) 418, and a step (or state) 420.

The state 402 may start the method 400. In the state 404, the video capture device 52 and the audio capture device 92 may capture the immersive video 120 and the sound field 130. Next, the method 400 may move to the decision state 406. In the decision state 406, the computing device 80 may determine whether the audio capture device 92 and the video capture device 52 are in an upright position and on the same horizontal plane. If the audio capture device 92 and the video capture device 52 are not in an upright position and on the same horizontal plane, the method 400 may move to the state 408. In the state 408, the computing device 80 may determine a tilt angle and apply a horizon correction. Next, the method 400 may move to the state 410. In the decision state 406, if the audio capture device 92 and the video capture device 52 are in an upright position and on the same horizontal plane, the method 400 may move to the state 410.

In the state 410, the computing device 80 may display the interface 100 with the representation of the immersive video 120 (e.g., the representation 150 described in association with FIG. 6). Next, in the state 412, the user may use the interface 100 to identify the reference object 154 corresponding to one of the axis ends (e.g., the frontal axis end 132a) of the audio capture device 92. In the state 414, the computing device 80 and/or the interface 100 may translate the coordinates of the reference object 154 (e.g., the X and Y coordinates of the reference object 154 on the video representation 150) to a longitude value and a latitude value. Next, in the state 416, the computing device 80 and/or the interface 100 may generate the icon 180 representing the axis end (e.g., the frontal axis end 132a) of the sound field 130. In the state 418, the computing device 80 and/or the interface 100 may determine the rotation for aligning the sound field 130 and the immersive video 120. Next, the method 400 may move to the state 420. The state 420 may end the method 400.

Referring to FIG. 14, a method (or process) 450 is shown. The method 450 may identify an orientation of a sound field when the audio capture device and the video capture device are not on the same horizontal plane. The method 450 generally comprises a step (or state) 452, a step (or state) 454, a step (or state) 456, a decision step (or state) 458, a step (or state) 460, a step (or state) 462, a step (or state) 464, a step (or state) 466, a step (or state) 468, a step (or state) 470, and a step (or state) 472.

The state 452 may start the method 450. In the state 454, the user may use the interface 100 to identify the first axis end (e.g., the frontal axis end 132a) for the sound field 130 on the representation 200 of the immersive video 120. Next, in the state 456, the computing device 80 and/or the interface 100 may translate the coordinates identified to a longitude value and a latitude value (e.g., indicated by the icon 180'). Next, the method 450 may move to the decision state 458.

In the decision state 458, the computing device 80 may determine whether the microphone 92 and the camera 52 are on the same horizontal plane. If the microphone 92 and the camera 52 are on the same horizontal plane, the method 450 may move to the state 470. If the microphone 92 and the camera 52 are not on the same horizontal plane, the method 450 may move to the state 460. In the state 460, the computing device 80 and/or the interface 100 may calculate the constraints for the intersections of the ends (e.g., 132a-132b, 134a-134b and/or 136a-136b) of the axes of the sound field 130 with the immersive video 120. Next, the method 450 may move to the state 462.

In the state 462, the computing device 80 and/or the interface 100 may generate the locus curve 202 on the representation 200 of the immersive video 120. Next, in the state 464, the computing device 80 and/or the interface 100 may constrain the location of the second axis end (e.g., the left axis end 134b represented by the icon 182a') to the locus curve 202 (e.g., the user input for selecting the axis end may be limited to a location on the locus curve 202). Next, in the state 466, the user may identify the second axis end (e.g., the left axis end 134b) on the locus curve 202. In the state 468, the computing device 80 and/or the interface 100 may translate the coordinates of the second axis end to a longitude value and a latitude value. Next, the method 450 may move to the state 470.

In the state 470, the computing device 80 and/or the interface 100 may determine the rotation for aligning the sound field 130 and the immersive video 120 (e.g., based on the longitude and latitude values). Next, the method 450 may move to the state 472. The state 472 may end the method 450.

In some embodiments, the immersive video 120 may be displayed on the head-mounted playback device 94. The content creator may interact with the interface 100 using the head-mounted playback device 94 to identify the orientation of the sound field 130 with respect to the immersive video 120. In an example where the content creator does not know onto which video objects (e.g., the reference objects 154) the sound field axis ends 132a-132b, 134a-134b and/or 136a-136b point to, the content creator may interact with the interface 100 using the head-mounted playback device 94. The head-mounted playback device 94 may implement binaural processing and/or motion tracking.

The interface 100 and/or the computing device 80 may playback audio from the sound field 130 using the audio output devices 90a'-90b'. The audio from the sound field 130 may be rotated according to the head motion detected by the head-mounted playback device 94. In an example, the user may hear a sound from a location to the left hand side through the headset 90a'-90b'. After the user turns his/her head to the left (e.g., the direction of the sound), the sound field 130 may be rotated by the computing device 80 and/or the interface 100 based on the head motion detected and the location of the sound may be frontal.

Using the rotation of the sound field 130 based on the head movement detected by the head-mounted playback device 94, the human operator may be able to locate particular audio sources (e.g., the audio sources 152a-152b) in the sound field 130 and rotate the head-mounted playback device 94 (e.g., in yaw and pitch) so that the location of the audio sources become rendered such that they are located in the front (e.g., the viewport). When the user is satisfied that the audio source is located in the front, the user may interact with the interface 100 (e.g., press a key on the keyboard 86) to record the corresponding rotation of the sound field 130 that puts the source in the frontal position. Then, the user may identify the audio emitting object (e.g., the reference object 154) in the immersive video 120 (e.g., click on the reference object 154 using the mouse 88 in the representation of the immersive video 120). By identifying the reference object 154, the interface 100 and/or the computing device 80 may record the position of the axis ends 132a-132b, 134a-134b and/or 136a-136b of the sound field 130 and/or the axes 122a-122b, 124a-124b and/or 126a-126b of the immersive video 120.

In embodiments where the camera 52 and the microphone 92 are not in the upright position and/or are not on the same horizontal plane, the human operator may have to repeat locating audio sources using the head-mounted playback device 94 for at least two distinct audio sources. In an example, the audio sources may not necessarily have to be identified using the same video frame from the immersive video 120. By identifying two distinct audio sources (e.g., one or two axis ends of the sound field 130 in the immersive video 120 and the one or two recorded locations from the head-mounted playback device 94), the computing device 80 and/or the interface 100 may infer a 3D rotation to be applied to the sound field 130 to bring all axes from the sound field 130 and the immersive video 120 into alignment.

In some embodiments, the human operator may identify the orientation of the sound field 130 with respect to the immersive video 120 using a motion-tracked head-mounted display equipped with headphones (e.g., the head-mounted playback device 94), in an immersive environment. In an example, the human operator may identify an audio source in the sound field 130, rotate his/her head to bring the audio source into the frontal position, hit a keyboard key to record the rotation of the sound field 130, then move his/her head again to bring the audio emitting object in the video (e.g., the audio source 152a or the audio source 152b) in the center of the head-mounted display, and/or hit another keyboard key to record the rotation of the immersive video 120. By identifying one or more of the audio sources 152a-152b (or additional audio sources) the computing device 80 and/or the interface 100 may infer the 3D rotation to be applied to the sound field 130 to bring all axes into alignment with the immersive video 120.

In some embodiments, the camera 52 and the microphone 92 may be held together (e.g., connected, rigidly tied, part of the same component, a camera and microphone rig, etc.).

The camera 52 (or the computing device 80 and/or the interface 100) may implement image stabilization techniques to apply corrective rotations to the immersive video 120 to limit motion perceived by viewers (e.g., movements due to the camera being carried, shakiness, etc.). If the microphone 92 and the camera 52 are rigidly tied, the same rotation applied to the immersive video 120 for image stabilization may be applied to the sound field 130 by the computing device 80 and/or the interface 100 so that the sound field 130 remains aligned with the immersive video 120.

Independent of how the sound field 130 and the immersive video 120 are aligned, if either the camera 52 or the audio capture device 92 move independently (or if the initial alignment was not performed properly), the alignment may be adjusted again later in the video sequence. In an example, the computing device 80 and/or the interface 100 may implement a keyframe mechanism to smoothly interpolate the rotation between the immersive video 120 and the sound field 130. Keyframes may be placed by repeating any of the described techniques for identifying the orientation of the sound field 130 with respect to the immersive video 120 and/or applying the rotation to the sound field 130 and/or the immersive video 120 to perform the alignment. In an example, keyframes may be used to perform the image stabilization and/or the additional rotations to keep the sound field 130 aligned with the immersive video 120 when the image stabilization is performed.

In some embodiments, the alignment of the sound field 130 and the immersive video 120 may be performed automatically by the computing device 80 and/or the interface 100 based on inertial measurements. In an example, the camera 52 and/or the microphone 92 may comprise inertial measurement sensors (e.g., accelerometers, gyroscopes, a digital compass, magnetometers, etc.) such as the sensor 116 and/or the sensor 118. The inertial measurement sensors 116 and 118 may be mounted in and/or on the camera 52 and/or audio capture device 92, respectively. Measurements performed by the inertial measurement sensors 116 and/or 118 may indicate an absolute orientation (e.g., relative to the earth) of the camera 52 and/or the audio recording device 92. The computing device 80 may receive the data from the inertial measurement sensors 116 and/or 118 to determine the absolute orientation.

Based on the absolute orientation, a relative offset between the two coordinate systems (e.g., the coordinate system of the immersive video 120 and the coordinate system of the sound field 130) may be determined by the computing device 80 and/or the interface 100. The coordinates of the audio sound field 130 and/or the coordinates of the immersive video 120 may be rotated such that the sound field 130 and the immersive video 120 may come into alignment. Any additional offset caused by further realignment of the video may also be detected by the inertial measurement sensors 116 and/or 118 and be taken into account (e.g., if the user has moved the video to place a certain object in the center, the same rotations may be applied to the audio). The inertial measurements may be sampled at regular intervals over time to allow for automatic tracking of adjustments over time. In an example, inertial measurement samples may be implemented when the camera 52 and/or the microphone 92 are part of a mobile recording rig.

In some embodiments, the equirectangular projection may be used to represent the immersive video 120 and/or the axis ends 132a-132b, 134a-134b and 136a-136b on the interface 100. Other types of projections may be implemented by the interface 100 and/or the computing device 80 to determine the orientation of the immersive video 120 and/or the sound field 130. Generally, any type of projection may be implemented. In one example, a projection that displays the entire immersive video 120 at once may be implemented. In another example, a projection that uses a standard rectilinear projection used by interactive viewers (e.g., the classical 2D projection used in head-mounted displays to mimic an ideal pinhole camera model) that partially displays only some point of view extracted from the full immersive video 120 (e.g., the viewport chosen interactively by the user) may be implemented. With the projection implemented by the computing device 80 and/or the interface 100, the sound field axis ends 132a-132b, 134a-134b and/or 136a-136b and/or the loci of free axes 202 (e.g., which translate into different types of curves, depending on the type of projection) may be visualized on the interface 100.

The computing device 80 and/or the interface 100 may be implemented to identify one or more of the axis ends 132a-132b, 134a-134b and/or 136a-136b in the immersive video 120 (e.g., the representation 150 of the immersive video 120) to determine an orientation of the sound field 130. The computing device 80 and/or the interface 100 may be configured to rotate the sound field 130 around the fixed axes in the immersive video 120. The interface 100 may generate markers, representations of the axis ends (e.g., the frontal axis end 132a, the back axis end 132b, the right axis end 134a, the left axis end 134b, the top axis end 136a and/or the bottom axis end 136b) of the sound field 130, labels and/or other symbols to identify a relationship between the sound field 130 and the immersive video 120.

The computing device 80 and/or the interface 100 may be configured to calculate the loci 202 of "free" markers to partially or entirely display onto the video representation 200. In one example, the loci 202 may be implemented to guide the users by enabling the free markers corresponding to the axis ends (e.g., 132a'-132b', 134a'-134b' and/or 136a'-136b') to slide along the corresponding loci. In another example, the loci 202 may be implemented to guide the users by enabling the free markers to be attracted to the loci 202 (e.g., following the mouse motion and/or input from other input devices).

In some embodiments, the computing device 80 and/or the interface 100 may be configured to rotate the sound field 130 before encoding the bitstream 112' with the rotated sound field 130 and the immersive video 120. In one example, the computing device 80 may receive orientation information (e.g., the signal METADATA_V and/or the signal METADATA_A) from the inertial sensor 116 and/or 118 and the computing device 80 and/or the interface 100 may automatically calculate and/or perform the rotation to the immersive video 120 and/or the immersive audio 130. In another example, the computing device 80 and/or the interface 100 may calculate and/or perform the rotation to the immersive video 120 and/or the immersive audio 130 in response to input from a user (e.g., the user interacting with the interface 100). In some embodiments, the computing device 80 and/or the interface 100 may be configured to embed the calculated rotations into the bitstream output 112 as metadata. The parameters embedded as the metadata (e.g., the signal METADATA, the signal METADATA_V and/or the signal METADATA_A) may comprise the roll 138a, the pitch 138b and/or the yaw 138c of the 3D sound field 130 to align the sound field 130 with the immersive video 120 (or the yaw/pitch/roll for the immersive video 120).

The metadata parameters may also comprise a quaternion, and/or the 2D coordinates of the sound field axis intersections with the representation of the immersive video 120. In some embodiments, the metadata may use a common referential (e.g., the horizon and the North Pole) for both devices (e.g., the camera 52 and the microphone 92). In some embodiments, the metadata may use different referentials for the camera 52 and the microphone 92. If the camera 52 and the microphone 92 do not use a common referential, the computing device 80 and/or the interface 100 may determine the rotation between the referentials (e.g., using factory data and/or one or more of the described techniques). The metadata parameters may further comprise the data for the automatic alignment. In an example, the computing device 80 and/or the interface 100 may compute a 3D rotation to bring the immersive video 120 and sound field 130 into alignment and the computations may be transmitted as the metadata.

The computing device 80 and/or the interface 100 may be configured to receive one or more audio streams (e.g., one or more of the sound fields 130). Mixing several input audio streams may be possible. Generally, for multiple audio streams the techniques described may be repeated for each input audio stream.

The functions and structures illustrated in the diagrams of FIGS. 1 to 14 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A method for sound field alignment for an immersive video signal, comprising the steps of:
   (A) receiving said immersive video signal;
   (B) receiving one or more audio streams configured to generate a sound field;
   (C) identifying an orientation for said sound field with respect to said immersive video signal; and
   (D) determining a rotation of said sound field based on said orientation, wherein (a) said rotation of said sound field aligns said sound field to said immersive video signal, (b) identifying said orientation comprises identifying a first axis end based on (i) an audio capture device capturing said audio streams sharing a horizontal plane with a video capture device capturing said immersive video and (ii) said audio capture device and said video capture device having an upright orientation and (c) if said audio capture device and said video capture device do not share said horizontal plane, said method further comprises the step of performing a horizon correction based on a tilt angle determined by an associated gyroscope for at least one of (i) said audio capture device and (ii) said video capture device.

2. The method according to claim 1, wherein identifying said orientation comprises (i) identifying a first axis for said sound field with respect to said immersive video signal and (ii) identifying a rotation of said sound field around said first axis.

3. The method according to claim 1, wherein identifying said orientation comprises (i) identifying a first axis for said sound field with respect to said immersive video signal and (ii) identifying a second axis for said sound field with respect to said immersive video signal.

4. The method according to claim 3, wherein (i) said sound field is configured to rotate around said first axis and (ii) said second axis is constrained to lie on a pre-determined curve displayed on a representation of said immersive video signal.

5. The method according to claim 1, wherein (a) the origin of axes of said immersive video signal and the origin of axes of said audio streams are (i) aligned and (ii) fixed and (b) said orientation of said axes of said audio streams is determined based on parameters identifying a direction of an audio capture device during a capture of said immersive video signal.

6. The method according to claim 1, wherein said orientation for said sound field is identified based on a plurality of commands received from a user while said user observes a representation of said immersive video signal.

7. The method according to claim 6, wherein said representation of said immersive video signal further comprises a visual representation of a coordinate system corresponding to said sound field.

8. The method according to claim 6, wherein (i) said user identifies a reference object on said representation of said immersive video and (ii) coordinates of said reference object are converted to a longitude value.

9. The method according to claim 8, wherein a graphic is generated on said representation of said immersive video to identify said orientation for said sound field.

10. The method according to claim 6, wherein (i) said representation of said immersive video signal is presented to said user on a motion-tracking display, (ii) said sound field is presented to said user with a binaural audio output device and (iii) said user inputs said commands to identify said orientation for said sound field by bringing an audio source to a frontal position on said representation of said immersive video signal.

11. The method according to claim 1, wherein said rotation is applied to said sound field.

12. The method according to claim 1, wherein parameters are generated to represent said rotation and said parameters are sent to a video output device as metadata.

13. The method according to claim 1, wherein an adjustment to said rotation is performed based on an interpolation of a plurality of keyframes.

14. The method according to claim 1, wherein corrective rotations are applied to said sound field based on corresponding corrective rotations to said immersive video signal implemented to perform image stabilization.

15. The method according to claim 1, wherein identifying said orientation and determining said rotation is based on inertial measurements from (i) a first sensor configured to indicate an absolute orientation of a video capture device and (ii) a second sensor configured to indicate an absolute orientation of an audio capture device.

16. The method according to claim 1, wherein said immersive video signal and said sound field are combined in a single stream.

17. A system comprising:
   a video source configured to generate an immersive video signal;
   one or more audio sources configured to generate a sound field; and
   a computing device comprising one or more processors configured to (i) identify an orientation for said sound field with respect to said immersive video signal and (ii) determine a rotation of said sound field based on said orientation, wherein (a) said rotation of said sound field aligns said sound field to said immersive video signal, (b) identifying said orientation comprises identifying a first axis end based on (i) said audio sources sharing a horizontal plane with said video source capturing said immersive video and (ii) said audio sources and said video source having an upright orientation and (c) if said audio sources and said video source do not share said horizontal plane, said processors are further configured to perform a horizon correction based on a tilt angle determined by an associated gyroscope for at least one of (i) said audio sources and (ii) said video source.

18. A system comprising:
   a video source configured to generate a plurality of video streams that capture a view of an environment;
   one or more audio sources configured to capture audio data of said environment; and
   a computing device comprising one or more processors configured to (i) perform a stitching operation on said plurality of video streams to generate a video signal representative of an immersive field of view of said environment, (ii) generate a sound field based on said audio data, (iii) identify an orientation for said sound field with respect to said video signal, and (iv) determine a rotation of said sound field based on said orientation, wherein (a) said rotation of said sound field aligns said sound field to said video signal, (b) identifying said orientation comprises identifying a first axis end based on (i) said audio sources sharing a horizontal plane with said video source capturing said immersive video and (ii) said audio sources and said video source having an upright orientation and (c) if said sources and said video source do not share said horizontal plane, said processors are further configured to perform a horizon correction based on a tilt angle determined by an associated gyroscope for at least one of (i) said audio sources and (ii) said video source.

* * * * *